(12) United States Patent
Micali et al.

(10) Patent No.: US 8,983,874 B2
(45) Date of Patent: Mar. 17, 2015

(54) METHOD AND SYSTEM FOR MICROPAYMENT TRANSACTIONS

(75) Inventors: Silvio Micali, Brookline, MA (US); Ronald L. Rivest, Arlington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 660 days.

(21) Appl. No.: 12/579,313

(22) Filed: Oct. 14, 2009

(65) Prior Publication Data

US 2010/0241569 A1    Sep. 23, 2010

Related U.S. Application Data

(63) Continuation of application No. 10/476,128, filed as application No. PCT/US02/12189 on Apr. 17, 2002, now abandoned.

(60) Provisional application No. 60/287,251, filed on Apr. 27, 2001, provisional application No. 60/306,257, filed on Jul. 18, 2001, provisional application No. 60/344,205, filed on Dec. 26, 2001.

(51) Int. Cl.
*G06Q 20/00* (2012.01)
*G06Q 20/06* (2012.01)
(Continued)

(52) U.S. Cl.
CPC .............. *G06Q 20/06* (2013.01); *G06Q 20/027* (2013.01); *G06Q 20/02* (2013.01); *G06Q 20/04* (2013.01);
(Continued)

(58) Field of Classification Search
USPC ................................ 705/50–79; 235/370, 380
See application file for complete search history.

(56) References Cited

U.S. PATENT DOCUMENTS 4,868,877 A * 9/1989 Fischer .......................... 713/157
4,995,082 A * 2/1991 Schnorr ......................... 713/169
(Continued)

FOREIGN PATENT DOCUMENTS

EP       1271434 A1    1/2003
WO   WO-9629668 A1    9/1996
(Continued)

OTHER PUBLICATIONS

Pedersen, Torben Pryds. Non-Interactive and Information-Theoretic Secure Verifiable Secret Sharing. Computer Science Department, Aarhus University, Denmark. 1992. pp. 129-140.
International Search Report, PCT/US02/12190, Mailed Feb. 26, 2003.
Supplementary European Search Report EP 02723888.
Micali et al., "Michropayments Revisited", B. Preneel (Ed.): CT-RSA 2002, LNCS 2271, pp. 149-163, 2002.
(Continued)

*Primary Examiner* — Mamon Obeid
(74) *Attorney, Agent, or Firm* — Daly, Crowley, Mofford & Durkee, LLP

(57) ABSTRACT

A micropayment system and method is presented for a payor U to establish payment to payee M for a transaction T, which typically has a very low value $T_v$. The micropayment scheme minimizes the bank's processing costs, while at the same time eliminating the need for users and merchants to interact in order to determine whether a given micropayment should be selected for payment. In one embodiment, the micropayment scheme includes time constraints, which require that an electronic check C for the transaction T be presented to a bank B for payment within a predetermined time/date interval. In another embodiment, the micropayment scheme includes a selective deposit protocol, which guarantees that a user is never charged in excess of what he actually spends, even within a probabilistic framework. In another embodiment, the micropayment scheme includes a deferred selection protocol, which provides the bank with control and flexibility over the payment selection process.

6 Claims, 7 Drawing Sheets

(51) Int. Cl.
*G06Q 20/04* (2012.01)
*G06Q 20/22* (2012.01)
*G06Q 20/36* (2012.01)
*G06Q 20/38* (2012.01)
G06Q 20/02 (2012.01)

(52) U.S. Cl.
CPC ............ *G06Q 20/0425* (2013.01); *G06Q 20/29* (2013.01); *G06Q 20/3674* (2013.01); *G06Q 20/382* (2013.01); *G06Q 20/3825* (2013.01)
USPC .................. 705/79; 705/64; 705/71; 705/75; 705/78; 235/379; 235/380

(56) References Cited

U.S. PATENT DOCUMENTS

| | | | |
|---|---|---|---|
| 5,218,637 A * | 6/1993 | Angebaud et al. | 713/173 |
| 5,231,668 A * | 7/1993 | Kravitz | 380/28 |
| 5,420,926 A | 5/1995 | Low et al. | |
| 5,530,232 A | 6/1996 | Taylor | |
| 5,557,516 A | 9/1996 | Hogan | |
| 5,578,808 A | 11/1996 | Taylor | |
| 5,606,617 A * | 2/1997 | Brands | 380/30 |
| 5,666,420 A * | 9/1997 | Micali | 380/30 |
| 5,721,678 A | 2/1998 | Widl | |
| 5,761,305 A * | 6/1998 | Vanstone et al. | 713/171 |
| 5,794,207 A | 8/1998 | Walker et al. | |
| 5,821,871 A * | 10/1998 | Benzler | 340/5.8 |
| 5,850,443 A * | 12/1998 | Van Oorschot et al. | 380/285 |
| 5,903,652 A | 5/1999 | Mital | |
| 5,978,780 A | 11/1999 | Watson | |
| 5,999,625 A | 12/1999 | Bellare et al. | |
| 5,999,919 A * | 12/1999 | Jarecki et al. | 705/40 |
| 6,000,608 A | 12/1999 | Dorf | |
| 6,021,399 A * | 2/2000 | Demers et al. | 705/39 |
| 6,029,151 A * | 2/2000 | Nikander | 705/39 |
| 6,049,786 A * | 4/2000 | Smorodinsky | 705/40 |
| 6,055,508 A * | 4/2000 | Naor et al. | 705/7.38 |
| 6,108,644 A | 8/2000 | Goldschlag et al. | |
| 6,125,445 A * | 9/2000 | Arditti et al. | 713/169 |
| 6,134,326 A * | 10/2000 | Micali | 380/30 |
| 6,189,787 B1 | 2/2001 | Dorf | |
| 6,205,553 B1 | 3/2001 | Stoffel et al. | |
| 6,222,914 B1 | 4/2001 | McMullin | |
| 6,324,525 B1 | 11/2001 | Kramer et al. | |
| 6,341,273 B1 * | 1/2002 | Briscoe | 705/41 |
| 6,446,051 B1 * | 9/2002 | Gupta | 705/52 |
| 6,529,885 B1 | 3/2003 | Johnson | |
| 6,594,640 B1 | 7/2003 | Postrel | |
| 6,779,114 B1 * | 8/2004 | Chow et al. | 713/189 |
| 6,820,061 B2 | 11/2004 | Postrel | |
| 6,837,426 B2 | 1/2005 | Tidball et al. | |
| 6,920,611 B1 | 7/2005 | Spaeth et al. | |
| 6,985,873 B2 | 1/2006 | Sullivan | |
| 7,003,504 B1 | 2/2006 | Angus et al. | |
| 7,020,638 B1 * | 3/2006 | Yacobi et al. | 705/69 |
| 7,021,531 B2 | 4/2006 | Myttenaere | |
| 7,072,864 B2 | 7/2006 | Brake, Jr. et al. | |
| 7,116,772 B2 | 10/2006 | Bern et al. | |
| 7,119,659 B2 | 10/2006 | Bonalle et al. | |
| 7,146,344 B2 | 12/2006 | Wankmueller | |
| 7,163,145 B2 | 1/2007 | Cohagan et al. | |
| 7,171,559 B1 * | 1/2007 | Bao et al. | 713/169 |
| 7,172,112 B2 | 2/2007 | Bonalle et al. | |
| 7,181,017 B1 * | 2/2007 | Nagel et al. | 380/282 |
| 7,191,939 B2 | 3/2007 | Beck et al. | |
| 7,191,952 B2 | 3/2007 | Blossom | |
| 7,228,292 B2 | 6/2007 | Coyle | |
| 7,328,181 B2 * | 2/2008 | Sutton et al. | 705/35 |
| 7,404,080 B2 * | 7/2008 | Jakobsson | 713/168 |
| 7,413,119 B2 * | 8/2008 | Kubo et al. | 235/379 |
| 7,475,807 B2 * | 1/2009 | Halpin et al. | 235/378 |
| 7,587,368 B2 * | 9/2009 | Felsher | 705/65 |
| 7,610,407 B2 * | 10/2009 | Karp | 709/246 |
| 7,668,776 B1 * | 2/2010 | Ahles | 705/38 |
| 7,725,403 B2 * | 5/2010 | Boyd et al. | 705/65 |
| 7,896,234 B2 * | 3/2011 | Kubo et al. | 235/379 |
| 7,905,396 B2 * | 3/2011 | Tidwell et al. | 235/379 |
| 7,922,098 B1 * | 4/2011 | Ma et al. | 235/493 |
| 7,954,698 B1 * | 6/2011 | Pliha | 235/379 |
| 8,025,220 B2 * | 9/2011 | Blume et al. | 235/380 |
| 8,082,446 B1 * | 12/2011 | Carroll | 713/176 |
| 8,296,232 B2 * | 10/2012 | Tullis et al. | 705/39 |
| 8,300,798 B1 * | 10/2012 | Wu et al. | 379/265.11 |
| 8,302,855 B2 * | 11/2012 | Ma et al. | 235/379 |
| 8,430,309 B2 * | 4/2013 | Ma et al. | 235/380 |
| 8,762,236 B1 * | 6/2014 | Shirey et al. | 705/35 |
| 8,777,104 B1 * | 7/2014 | Brock et al. | 235/438 |
| 8,831,205 B1 * | 9/2014 | Wu et al. | 379/265.11 |
| 2001/0032139 A1 | 10/2001 | Debonnett | |
| 2001/0038033 A1 | 11/2001 | Habib | |
| 2002/0046169 A1 | 4/2002 | Keresman et al. | |
| 2002/0087392 A1 | 7/2002 | Stevens | |
| 2002/0128917 A1 | 9/2002 | Grounds | |
| 2002/0156696 A1 | 10/2002 | Teicher | |
| 2002/0198835 A1 | 12/2002 | Watson | |
| 2003/0144907 A1 | 7/2003 | Cohen et al. | |
| 2004/0010462 A1 | 1/2004 | Moon et al. | |
| 2004/0089711 A1 * | 5/2004 | Sandru | 235/379 |
| 2004/0193485 A1 | 9/2004 | Ilberg | |
| 2004/0199475 A1 * | 10/2004 | Rivest et al. | 705/67 |
| 2004/0230483 A1 | 11/2004 | Kepecs | |
| 2005/0021399 A1 | 1/2005 | Postrel | |
| 2005/0021401 A1 | 1/2005 | Postrel | |
| 2005/0027610 A1 | 2/2005 | Wharton | |
| 2005/0149394 A1 | 7/2005 | Postrel | |
| 2005/0171904 A1 * | 8/2005 | Yacobi et al. | 705/40 |
| 2006/0080238 A1 | 4/2006 | Nielsen et al. | |
| 2006/0149671 A1 | 7/2006 | Nix et al. | |
| 2006/0149686 A1 | 7/2006 | Debonnett | |
| 2007/0000999 A1 * | 1/2007 | Kubo et al. | 235/380 |
| 2007/0038515 A1 | 2/2007 | Postrel | |
| 2007/0063024 A1 | 3/2007 | Guillot | |
| 2007/0267479 A1 | 11/2007 | Nix et al. | |
| 2007/0284433 A1 * | 12/2007 | Domenica et al. | 235/379 |
| 2008/0040260 A1 * | 2/2008 | Belyi | 705/38 |
| 2008/0040261 A1 | 2/2008 | Nix et al. | |
| 2008/0314977 A1 * | 12/2008 | Domenica et al. | 235/380 |
| 2009/0259850 A1 * | 10/2009 | Ishibashi | 713/169 |
| 2009/0309701 A1 * | 12/2009 | Peled | 340/5.83 |
| 2011/0087598 A1 * | 4/2011 | Bozeman | 705/45 |
| 2011/0129128 A1 * | 6/2011 | Makimoto et al. | 382/124 |
| 2012/0104093 A1 * | 5/2012 | Ma et al. | 235/379 |
| 2012/0330836 A1 * | 12/2012 | Aidasani et al. | 705/44 |
| 2013/0062405 A1 * | 3/2013 | Ma et al. | 235/379 |
| 2014/0247786 A1 * | 9/2014 | Izu et al. | 370/329 |

FOREIGN PATENT DOCUMENTS

| | | |
|---|---|---|
| WO | WO-02079922 A2 | 10/2002 |
| WO | WO-2006026576 A2 | 3/2006 |
| WO | WO-2007127729 A2 | 11/2007 |

OTHER PUBLICATIONS

Rivest, "Electronic Lottery Tickets As Micropayments", Lecture Notes in Computer Science, Springer Verlag, New York, NY, US, vol. 1318, Feb. 24, 1997, pp. 307-314, ISSN: 0302-9743.

Jarecki, et al., "An Efficient Micropayment System Based on Probabilistic Polling", Lecture Notes in Computer Science, Springer Verlag, New York, NY, US, vol. 1318, Feb. 24, 1997, pp. 173-191, ISSN: 0302-9743.

Rivest, et al., "PayWord and MicroMint: Two Simple Micropayment Schemes", Security Protocols, International Workshop Proceedings, 1997, pp. 69-87.

PCT International Search Report and Written Opinion for PCT/US2002/012189; Massachusetts Institute of Technology; Feb. 26, 2003; 4 pgs; ISA/US.

Rivest et al.; "Micropayment Processing Method and System;" U.S. Appl. No. 10/553,611; Oct. 18, 2005; 357 pages.

United States Patent and Trademark Office; Office Action; U.S. Appl. No. 11/748,384; Jun. 27, 2008; 9 pages.

* cited by examiner

METHOD AND SYSTEM FOR MICROPAYMENT TRANSACTIONS

CROSS-REFERENCE TO RELATED APPLICATIONS

This application is a continuation application of U.S. patent application Ser. No. 10/476,128, entitled "Method and System for Micropayment Transactions" and filed on Oct. 27, 2003; which is a National Phase application of PCT Application No. PCT/US02/12189, entitled "Method and System for Micropayment Transactions" and filed on Apr. 17, 2002; which claims benefit of priority to: (1) U.S. Provisional Application Ser. No. 60/287,251, entitled "Method and System For Micropayment Transactions" and filed on Apr. 27, 2001; 12) U.S. Provisional Application Ser. No. 60/306,257, entitled "Method and System for Micropayment Transactions" and filed on Jul. 18, 2001; and 13) U.S. Provisional Application Ser. No. 60/344,205, entitled "Method and System for Micropayment Transactions" and filed on Dec. 26, 2001; all of which are incorporated by reference herein in their entireties, as if fully set forth below.

BACKGROUND

The growth in electronic commerce systems has led to a rapid growth in the number of financial transactions taking place across electronic networks. Micropayments enable new forms of electronic commerce transactions, by providing a convenient method for financing on-line low-value services such as information retrieval services. Micropayments may have very low value—in some cases fractions of a penny—but may be executed in very high volumes. By way of example, information service providers may wish to charge for their services in small increments. Micropayments may be used to pay for each web page visited or for each minute of music or video streamed to the user.

A simple form of an electronic payment scheme is an electronic check. An electronic check consists of a check that is digitally signed, rather than hand-signed. A digital signature allows the receiver of the check to verify both the authenticity of the signing party, and the integrity of the contents of the check (e.g., the date and amount of the check). The literature on public key cryptography provides many methods for implementing digital signatures, such as the RSA method described in "A method for obtaining digital signatures and public-key cryptosystems," Rivest, R. L., Shamir, A., and Adleman, L. A., Communications of the ACM, Vol. 21, No. 2, 1978, S. 120-126. As is well known, each party in a public key cryptosystem uses a unique pair of keys. Each pair includes a public key and a corresponding private (or secret) key. While the public key is made available to the public, the corresponding private key is known and accessible only to the owner, who safeguards it and keeps it secret. It is not computationally feasible to derive the private key from the knowledge or discovery of the corresponding public key. Therefore, making a public key available to the public does not endanger the security of the matching private key. Because a private key is never accessible to anyone but its owner, public key cryptosystems enjoy an increased security, as compared to systems in which secret keys are shared among different parties.

In a public key cryptosystem, a sender who wishes to secretly send a message obtains the receiver's public key and uses it to encrypt the message. Upon receiving the encrypted message, the receiver uses his matching private key to decrypt it and read the original message. Without access to the matching private key, it is computationally infeasible to decrypt the encrypted message.

In a public key digital signature scheme, a signer of a message creates his digital signature by applying his private key to the message. The resulting digital signature is thus unique to both the message and to the particular private key used to create the digital signature. Anyone in possession of the message and the digital signature can verify the authenticity of the digital signature using the signer's public key.

A hash function is also used in many public key digital signature schemes. A hash function is an algorithm which, when applied to a message, creates a digital "fingerprint" of the message, in the form of a "hash value" that typically has a fixed length. A "one-way collision-resistant" (or secure) hash function is a hash function for which it is computationally infeasible to derive the original message from its hash value, or even to find two messages having the same hash value. The hash of a message thus works well as an identifying "fingerprint" for the message, since if one makes any change, even the slightest change, to a message, one invariably obtains a message with a different hash value.

It is common to use hash functions in digital signature schemes in a "hash and sign" manner. To create a digital signature in this way, the sender of a message applies a hash function to the message, thus computing a message digest or hash value for the message. The sender then applies his private key to the hash value to obtain his digital signature for that message.

The authenticity of the digital signature, as well as the integrity of the contents of the message, can be verified using the sender's public key and the hash function that was used to create the signature. The receiver can verify that the message was indeed signed by the sender by recomputing the hash value for the message, and then applying a verification procedure that takes as inputs this hash value and the sender's public key. The verification procedure might say, for example, to use the sender's public key as a decryption key and to accept the signature as valid if the decryption yields the recomputed hash value of the message. If verification succeeds, the receiver may be confident that the sender actually signed the message and that the message was not altered since it was signed.

In a typical electronic check payment scheme, a user pays a merchant for a transaction by providing a digital signature to a piece of data that identifies the transaction. The data may identify, among other things, the user, the user's bank account number, the merchant, the amount to be paid, the time of the transaction, and/or the information, services, or merchandise that has been purchased. Typically, the merchant deposits the electronic check that he receives from the user by sending the check to the bank.

The digital signature capabilities in an electronic check scheme may be supported by digital certificates. A digital certificate is most commonly an electronic document that asserts that a particular individual holds the private key corresponding to the public key given in the certificate. In other words, the certificate correlates a key pair with a particular party. Since the certificate is itself digitally signed by a trusted authority, a digital certificate is normally trusted as proof that the named party indeed owns the public key listed in the certificate and that the named party exclusively controls the corresponding private key. Digital certificates may also assert that the party is authorized to sign electronic payments or perform other specified actions.

After verifying the digital signature on an electronic check, the bank may credit the merchant with an appropriate amount, and may debit the user with an appropriate amount. The bank may also charge discretionary transaction fees or other fees.

Electronic payment systems, and in particular micropayment systems, face many challenges. A fundamental problem with micropayments lies in a bank's processing costs for the micropayments. Frequently, the cost to the bank of handling a micropayment transaction will be many times larger than the value of the micropayment itself. For example, processing a credit card transaction usually costs about 25 cents, while a typical micropayment may be worth about 1 cent or less. Exceptional efficiency is therefore required in order to support micropayments; otherwise the cost of the payment mechanism will much exceed the value of the payments.

Micropayment schemes therefore attempt to reduce the bank's processing costs by aggregating many small payments into fewer, larger payments. A variety of aggregation strategies are available. Some micropayment schemes have session-level aggregation: all payments between a user and a merchant during a given "session" are aggregated into a single larger payment. Another strategy is global aggregation: payments are aggregated across all user/merchant pairs. Global aggregation can provide greater flexibility and greater cost savings.

A number of micropayment schemes are known in the art, and surveys can be found in the literature, for example in "Digital Cash: Commerce on the Net," Peter Wayner, Academic Press, 1996. Micropayment schemes that are currently known include "PayWord" (described in "PayWord and MicroMint: Two simple micropayment schemes," Ronald L. Rivest and Adi Shamir, Fourth Cambridge Workshop on Security Protocols, Springer Verlag April 1996), and the "electronic lottery scheme" (described in "Electronic Lottery Tickets as Micropayments," Ronald L. Rivest, in Proceedings of Financial Cryptography '97, vol. 1318 of Lecture Notes in Computer Science, pp. 307-314, Springer 1997). Other known micropayment schemes include, but are not limited to, "Millicent" by Manasse et al., "MicroMint" by Rivest and Shamir, "NetCard" by Anderson, "PayTree" by Jutla and Yung, "MicroiKP" by Hauser et al., the probabilistic polling scheme by Jarecki and Odlyzko, a proposal for "transactions using bets" by Wheeler, a similar proposal by Pedersen, and a related proposal for micropayments by efficient coin-flipping, by Lipton and Ostrovsky. The Jarecki/Odlyzko probabilistic polling scheme is disclosed in U.S. Pat. No. 5,999,919, entitled "Efficient Micropayment System," and issued to Stanislaw Jarecki and Andrew M. Odlyzko on Dec. 7, 1999.

PayWord is a micropayment system based on public key digital signature schemes and one-way hash-functions. In the PayWord system, a user receives from a bank a digital certificate, which authorizes the user to make chains of hash values, or "paywords" $w_i$. These paywords can be monetarily redeemed from the bank by the merchant. The i-th payword is related to the i+1-th payword by the relation:

$$w_i = h(w_{i+i}),$$

where h is a one-way hash function. Thus it is computationally infeasible to derive $w_{i+1}$ from $h(w_{i+i})$. The i+1-st payword $w_{i+1}$ can be verified by the merchant using the i-th payword, by performing the hash operation h on $w_{i+1}$. In the PayWord scheme, the user computes a chain of hash values, $w_0$, $w_1, \ldots, w_n$, and commits to the entire chain by sending his digital signature of the root $w_0$ to the merchant. Afterwards, the user makes each successive payment to the merchant by revealing the paywords consecutively in turn ($w_1, w_2, \ldots, w_i, \ldots$). Each consecutive value in the chain can be verified by the merchant, by performing the hash function on that value in order to check that it hashed to the previous value in the payword chain.

PayWord allows the merchant to conveniently aggregate the buyer's payments. After k micropayments have been made, if the merchant feels that, taken together, the k micropayments constitute a sizable enough macropayment, the merchant makes a single deposit in the bank for k cents (or other appropriate monetary units that represents each micropayment). The vendor reports to the bank only two values, $w_k$, and the user's signature of $w_0$. The bank verifies the user's signature of $w_0$, and iterates the hash function k times on $w_k$, to verify that this operation does indeed yield $w_0$. After verification, the bank pays k cents into vendor's account, and charges the user's account k cents, and charge other transaction fees at its discretion.

PayWord suffers from the disadvantage that the merchant cannot aggregate micropayments of different users. This is because in PayWord, each user must establish his own hash-value chain with the merchant, and because different hash-value chains cannot be merged. Many other micropayment proposals, such as Millicent, also suffer from this problem of not being able to aggregate micropayments across different user/merchant pairs. That is, PayWord only provides session-level aggregation, not global aggregation.

The electronic lottery scheme by Rivest provides another method for aggregating micropayments, so as to reduce transaction costs. This scheme is based on a selection rate or selection probability s ($0 < s < 1$) for each micropayment: on average, only one out of every $1/s$ micropayments is selected for actual payment. The selection rate s is known, predictable, and fixed. For each micropayment presented to the merchant, the merchant first verifies the user's signature on the root $w_0$ of the PayWord chain and verifies that the provided hash value $w_k$ indeed yields $w_0$ when iteratively hashed k times. If so, the merchant accepts the micropayment from the user. The merchant then goes through a predetermined interaction protocol with the user, in order to determine whether or not the micropayment should be selected for deposit at the bank. A non-selected check can not be deposited and is thus worthless to the merchant; it is thus discarded by the merchant. Only a micropayment that is selected (through the interaction protocol) is actually presented to the bank by the merchant, in order to receive payment. In this way, the bank does not have to process each and every micropayment, but only processes, on average, one out of $1/s$ micropayments. The bank's processing costs are thereby greatly reduced. To make this process fair to the merchant, for each selected micropayment, the merchant gets paid an amount $1/s$ times greater than the originally specified micropayment amount. In other words, the bank pays to the merchant an amount that is "scaled" to a value $1/s$ times the face value of the micropayment.

Despite its advantages, the electronic lottery scheme suffers from the drawback that the user and the merchant must interact for each micropayment, in order to determine whether a particular micropayment should be selected for deposit. This requirement considerably slows down the electronic payment system, and in some cases renders the scheme impracticable.

For the foregoing reasons, there is a need for a non-interactive micropayment method and system, which allow global aggregation of micropayments to minimize bank processing costs, but which at the same time do not require user-merchant interaction in the micropayment selection process.

In addition, it is desirable to incorporate time constraints into a micropayment system. For example, it would be advantageous to include in a micropayment system time constraints that require the merchant to deposit any payable check (i.e. a micropayment that is properly selected for deposit) in the bank within a reasonable time period, in order to receive payment from the bank. In this way, the user would not be charged too late, i.e. when a possible expenditure for the transaction is no longer in his budget. This type of constraint would also give an extra incentive to the merchant to verify that the time information on a check C is accurate, thereby enhancing the security of the system.

Another problem inherent in probabilistic micropayment schemes, besides the inefficiency caused by user-merchant interaction in the selection process, is the risk to the user of being charged in excess of what he actually spends. A user in a probabilistic micropayment scheme must deal with the probability (albeit small) that in some cases, by bad luck, he may have to pay more than what he actually spent. Such occurrences may be rare, and the relative impact of such a rare occurrence may decrease dramatically with the number of micropayments made. Nonetheless, the possibility, however slim, of being excessively charged may constitute a strong obstacle to a widespread acceptance of the scheme. This is because ordinary users are generally not accustomed to managing risk.

For the foregoing reasons, there is a need for a micropayment method and system, which not only minimizes bank processing costs, but also guarantee that the user is never charged in excess of what he actually spends.

Finally, micropayment systems which attempt to increase their efficiency generally call the bank into action only with respect to those payments that have been selected for payment by the merchant, and that generally constitute only a small fraction of the total number of payments. Such micropayment systems, however, do not provide the bank with any flexibility or control over the payment selection process. Such control may be advantageous to the bank in managing its risk.

It is therefore desirable that a micropayment scheme be available which not only eliminates the need for user-merchant interaction in the selection process, and shifts the risk of excessive payment away from the user to the bank or the merchant, but also provides the bank with some flexibility and control over the payment selection process.

SUMMARY OF THE INVENTION

The present invention relates to probabilistic micropayment schemes, which allow a user U (or other payor, henceforth referred to as "U" or "user") to establish payment to a merchant (or other payee, henceforth referred to as "M" or "merchant") for at least one transaction T. Typically, T has a very low value $T_V$, although the scheme featured in the present invention is applicable to any value of $T_V$. The micropayment schemes featured in the present invention minimizes the costs necessary for processing such micropayments, thereby significantly increasing the efficiency of the system. A number of additional advantages are also offered, as described below.

In a first embodiment of the invention, a micropayment protocol is presented which allows the merchant to determine, immediately upon receipt of a check and without interacting with the user, whether or not the check should be selected for payment. Unlike prior art probabilistic micropayment schemes, the micropayment protocol in this embodiment does not require that the payability determination be deferred until an interactive selection protocol takes place between the merchant and the user.

In a second embodiment of the invention, the micropayment scheme of the present invention incorporates time constraints into the system and uses them in a special way. These time constraints require that information regarding the time and/or date of the transaction be provided on a check, and that the time information on the check satisfy predetermined criteria, in order for the check to be selected for payment.

In a third embodiment of the invention, a selective deposit protocol is presented, which eliminates any risk to the user of being charged in excess of what he actually spends.

Finally, a fourth embodiment of the invention features a deferred selection protocol, which provides the bank (or other third party or broker, henceforth referred to as "bank") control and flexibility over the payment process.

In a micropayment scheme in accordance with the first embodiment of the present invention, a user U uses the records relating to the transaction T, in order to create a data string C related to T. C may be an electronic check signed by creating a digital signature for T, using a secret key of the user. The user causes the merchant to receive the check C. Upon receipt of C, the merchant associates with C an item V that is substantially unpredictable by the user. The merchant may use secret information SI, known only to the merchant, in order to associate V with C. By way of example, V may be the merchant's digital signature for C, denoted by $SIG_M(C)$, and created by the merchant using the merchant's secret signing key in a public key digital signature scheme.

The merchant then determines whether V satisfies a property P. In a preferred form, the property P may be related to the probability s that a given check C be selected for payment ($0<s<1$). If the merchant determines that the item V derived from the electronic check C does not satisfy the property P, the merchant simply discards the check C, and the bank never sees the check C. If the merchant determines that the item V (for example, $SIG_M(C)$) does satisfy the property P, the merchant causes the bank to receive information I that enables the bank to also verify whether V satisfies P. For example, I may be (or may include) the merchant's public key for the merchant's digital signature scheme, corresponding to the merchant's secret key used to create V. Upon receipt of I, the bank undertakes to independently verify whether V satisfies the property P. If the bank verifies that V does indeed satisfy the property P, the bank causes the merchant, or a fourth party other than the merchant, the user, or the bank, to receive an amount of money A. The amount A is typically greater than $T_V$, and in one form, may be related to the product of $T_V$ and the multiplicative inverse of the probability s. The amount A may be given by $A=[T_V*1/s]$.

A system for establishing payment for a transaction T, in accordance with the first embodiment of the present invention, includes a communications channel for transmitting electronic data between a first party (user or other party), a second party (merchant or other party), a third party (bank or other party), and a fourth party. The system includes means operative by the first party for inputting and storing a data string C derived from T. The system further includes means operative by the second party and responsive to C, for inputting and storing an item V associated with at least a portion of C and substantially unpredictable by the first party. The system includes means operative by the second party, for determining whether V satisfies a property P. The system further includes means, selectively operative by the second party when V satisfies P, for causing a third party to receive information I enabling the third party to verify that V satisfies P. The system further includes means, selectively operative by the third party when V satisfies P, for causing a fourth party to receive an amount A.

In a second embodiment of the present invention, time constraints are incorporated into the non-interactive micropayment protocol described above. In this embodiment, a user can establish payment to a merchant for a transaction T that is characterized in part by a time t. Typically, the time t indicates the time and/or date at which the transaction T takes place. The user creates a data string C that is related to T. In this embodiment, C must contain information regarding the time t of T. The user causes the merchant to receive C, or at least a portion of C that includes information on t. The merchant associates with C (or with the portion of C that he received) an item V that is substantially unpredictable by the user. The item V is a function of the time information on C, for example the merchant's digital signature (created using the merchant's secret key) of at least a portion of C that includes the time information. V may also be a digital signature of G(C), where G(C) denotes a function of C, or an algorithm using C. For example, G(C) may be a function that returns time/date information of C (e.g, the exactly same time/date information of C, or that time/date information "rounded up"), or time/date information of the transaction T to which C refers. The merchant then determines whether V satisfies a property P. If V does satisfy P, the merchant at time t' causes the bank to receive information I (which may include for example the merchant's public key corresponding to the merchant's secret key used to create V) enabling the bank to verify whether V satisfies P.

In the second embodiment of the invention, in order for the bank to cause a fourth party to receive an amount A, t'−t must be less than a predetermined time interval. This is another requirement, in addition to the requirement that V satisfy P. In other words, the bank will credit the merchant's account only if the merchant presents a payable check that contains information regarding a time t (at which the transaction T occurred), which is within prescribed time limits. For example, if the transaction T occurred on a day i, then the merchant may be required to deposit the corresponding check C within the end of the day i, or by day i+1, or by day i+n, where n is a predetermined integer. The time constraints in the protocol thus requires a timely deposit. Requiring timely deposits provides benefits by ensuring that the user is not charged too late; it also allows the bank to control other forms of risk, such as those arising from back-dated checks.

In a third embodiment of the present invention, a selective deposit protocol is presented which guarantees that a user is never charged more than what he actually spends. For each of one or more transactions $T_i$ (i=1, . . . , n), the user derives a check/micropayment $C_i$ having a face value $TV_i$ (possibly worth only a fraction of the costs necessary for the bank to process a transaction such as $T_i$), according to an underlying probabilistic payment scheme.

In the third embodiment of the invention, each check $C_i$ includes a progressive serial number $S_i$, preferably starting from 1. The serial number $S_i$ is preferably representative of the position of the check $C_i$ relative to other checks, in a time-ordered succession of checks derived by the user. In the third embodiment, the aggregate debit amount for a user is guaranteed to never be greater than the aggregate amount actually spent by the user, denoted by $TV_{agg}$ for convenience. Typically, when the user writes his i-th check, the aggregate amount $TV_{agg}$ is given by the aggregate amount of his checks, namely:

$$TV_{agg} = TV_1 + TV_2 + \ldots + TV_i.$$

For instance, the micropayment scheme featured in the third embodiment of the present invention forces $D_i$ to be no greater than $TV_{agg} = TV_1 + TV_2 + \ldots + TV_i$, if $C_i$ is the first check that is found to be payable, and $D_i$ is the corresponding debit amount. This guarantee is accomplished through a protocol in which the bank keeps track of the serial numbers of the checks it receives from the merchant. Before debiting the user, the bank must determine the serial number $S_{max}$ on the last check, among the ordered succession of checks, upon which payment was made. In an illustrative case, all of the transactions are worth an equal value TV. In this case, if $C_i$ is the next payable check, then the bank causes the user to be debited by an amount $D_i = (S_i - S_{max})*TV$. The amount $D_i$ thus only depends only on the number of checks the user has written since the last payment was made, and the aggregate debit amount is guaranteed to be no greater than $S_i*TV$.

Finally, in a fourth embodiment of the present invention, a deferred selection protocol is presented, which provides the bank with greater control and flexibility over the payment process. As in previous embodiments of the invention, the user derives a data string or "check" $C_i$ for each of one or more transactions $T_i$ (i=1, . . . , n), each having a value $TV_i$, and causes the merchant to receive $C_i$.

In the fourth embodiment of the invention, the merchant uniquely associates groups of the checks $C_i$ that he has received into m lists $L^k$, where k=1, . . . , m. Each list $L^k$ includes data strings $C^k_1, \ldots, C^k_{lk}$, where $l_k$ represents the total number of checks in a given list $L^k$. Thus, if n is the total number of checks in all m lists, $\Sigma^m_{k=1} l_k = n$.

The merchant commits to the m lists $L^k$ (k=1, . . . , m), by computing a commitment $CM^k$ for each $L^k$. The commitment $CM^k$ is preferably a hash value $H(L^k)$, where H is a one-way hash function. The merchant causes the bank to receive the commitments $CM^k$ (k=1, . . . , m).

Upon receipt of $CM^k$ (k=1, . . . , m), the bank implements the deferred selection protocol featured in the fourth embodiment of the present invention, by selecting one or more integer indices $i_1, i_2, \ldots i_r$. The value of r is arbitrary, and up to the bank. The bank causes the merchant to receive the selected indices $i_1, i_2, \ldots i_r$.

In response to receipt of the selected indices $i_1, i_2, \ldots i_r$, the merchant de-commits $CM^{i1}, CM^{i2} \ldots CM^{ir}$, thereby revealing $L^{i1}, \ldots L^{ir}$ to the third party (e.g., a bank). A fifth party (which may be the bank, or an entity other than the bank) causes a fourth party (which may be the merchant, or an entity other than the merchant) to receive a credit amount CR. The fifth party causes the user to be debited by a debit amount D.

Preferably, the credit amount CR is related to $V^k$, where $V^k$ represents the aggregate value of all the checks contained in a given list $L^k$, i.e.

$$V^k = TV^k_1 + \ldots TV^k_{l_k}.$$

The credit amount CR may be given by the aggregate value of all the checks contained in all of the m lists, i.e.

$$CR = V^1 + \ldots V^k + \ldots V^m = \Sigma^m_{k=1} V^k.$$

In this case, commitments to the values $V^i$ may have been provided to the bank when the commitments $CM^i$ to the lists were provided; then all the values $V^i$ are decommitted after the bank selects some of the lists by specifying their indices.

Alternatively, the credit amount CR may be related to the aggregate value of all the checks contained in just those lists whose indices were selected by the bank. This credit amount CR may be related to the just-mentioned aggregate value by a scale factor such as m/r (where the integers m and r are referenced above), in order to reflect the fact that the bank is only seeing a fraction r/m of the checks.

The corresponding debit amount D may be derived in one of several ways; the choice of method for deriving D may or may not be related to the method for computing CR. For example, the value D may be related to the aggregate value $$V^{i1} + V^{i2} + \ldots + V^{ir},$$

of all the checks contained in those lists whose indices match the indices selected by the bank and forwarded to the merchant; for example it might be the value of this sum scaled by a factor such as m/r. Or, the value D might be derived from the credit amount CR; for example, it could be equal to the credit amount CR. Or, the value D could be derived from the serial numbers on the checks contained in the selected lists, in the manner previously described. In most applications there will be a number of distinct users, and the amount each user is charged will depend in one way or another on just those checks written by that user in the selected lists. A preferred method of computing the debit amount $D_U$ for each user U would be to use a method based on the serial numbers of the checks written by user U.

BRIEF DESCRIPTION OF THE DRAWINGS

The invention can be more fully understood by referring to the following detailed description taken in conjunction with the accompanying drawings, in which.

DETAILED DESCRIPTION

Figure 1:
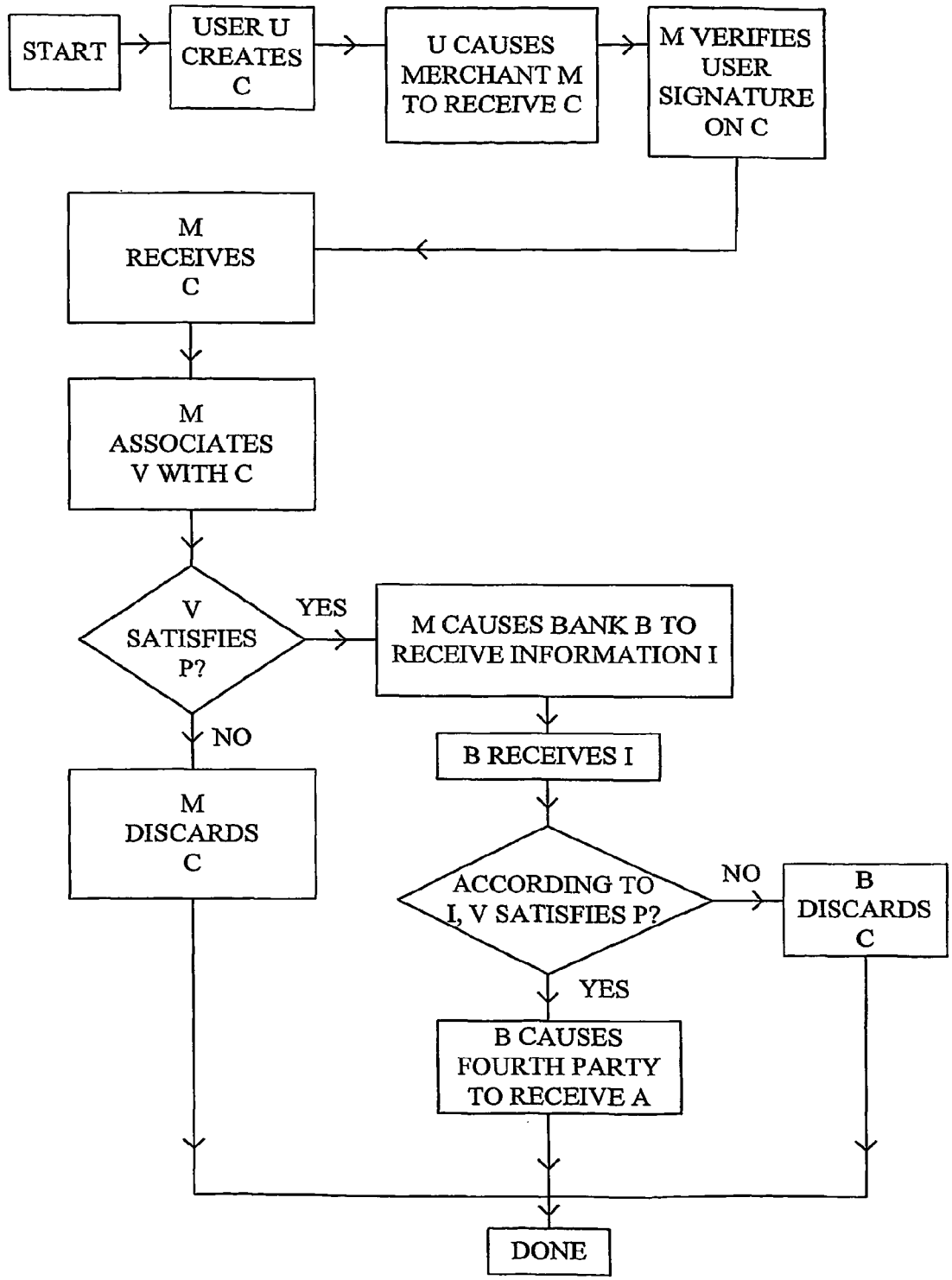
FIG. 1 provides, in schematic flow-chart form, an overview of a method for micropayment transactions, in accordance with a first embodiment of the present invention.

In the present invention, methods and systems are presented, which increase the efficiency and flexibility of micropayment schemes.

In the present invention, a micropayment system involves at least a first party, a second party, and a third party. In one form of the invention, the first party may represent a payor, for example a buyer or a user. The second party may represent a payee, for example a merchant of goods or a vendor of services. The third party may represent a broker or a bank. Additional parties may also be involved. In some situations, a single entity may play the roles of more than one party: for instance, the roles of both the second party and the third party. An example would be the situation in which a user wishes to make micropayments to his own bank. Alternatively, a single entity may play the roles of both the second party and the fourth party.

For ease of reference, in the sequel we may use the term "user" to refer to the "first party", the term "merchant" to refer to the "second party" and the term "bank" to refer to the third party broker, respectively. It is to be understood, however, that the first party need not be a user, nor the second party a merchant, nor the third party a broker or a bank.

Finally, additional parties may also be involved in micropayment schemes in accordance with the present invention. For instance, the third party may cause a fourth party (possibly cooperating with the second party) to receive payment. For example the first party may be the paying device of a motorist passing through a toll booth, the second party a device at the toll booth, the third party the motorist's bank, and the fourth party an entity collecting tolls. In this case, the motorist may present a micropayment at the toll booth device, and if the proper conditions arise a payment may be made by the motorist's bank to the toll-collecting entity. As another example, a fifth party may be involved: the third party may cause the fifth party to make an actual payment to the fourth or second party. For example, elaborating on the previous example, the third party could be the manufacturer of or an entity controlling or renting the paying device, and the fifth party may be the motorist's bank, which may ultimately pay the fourth party. The same fifth party, or the third party or another sixth party, may actually debit the first party or another party on his behalf.

I. Non-Interactive Micropayment Scheme

In a first embodiment of the invention, a micropayment scheme is presented which eliminates the need for a merchant to interact with the user, in order to determine whether or not a given payment should be selected. In this embodiment, when a user wishes to make a payment, the user creates an electronic document or "check," and causes the merchant to receive the check. In this embodiment, the merchant can determine, immediately upon receipt of the check, whether or not the check should be selected for presentation to the bank, so that an appropriate debiting of the user's account and a crediting of merchant's account can occur. The merchant is able to make such a determination without interacting with the user. Unlike in the case of prior art electronic lottery micropayment schemes, there is no need to defer such a determination until an interactive selection protocol takes place between the user and the merchant. In this way, the efficiency of the micropayment process is significantly enhanced.

In the first embodiment of the invention, the user typically needs to pay the merchant because of a transaction T, or a series of such transactions T. The transaction is typically characterized by a transaction value $T_V$ which may be very low, for example one cent or a fraction of a cent. The bank would therefore incur processing costs much higher than the transaction value itself, if the bank were to process payments for every single transaction.

FIG. 1 provides, in schematic flow-chart form, an overview of a method for micropayment transactions, in accordance with the first embodiment of the present invention. When a user wishes to make a payment in a micropayment scheme in accordance with the present invention, the user creates a data string or "electronic check" C, and sends C to the merchant, or otherwise causes the merchant to receive C. The check C is typically derived from a record T of the transaction. For example, the check C may be generated by creating a digital signature for the transaction, $SIG_U(T)$, using a secret key of the user; this signature by the user is verified by the merchant. The user's signature $SIG_U(T)$ may include, or may be accompanied by, sufficient information about T to enable this verification to proceed. The user may also cause the merchant to receive, or may incorporate in C, the digital certificate enabling verification of his digital signature—e.g., the digital certificate specifying the public key of U to be used to verify U's digital signature. Each check C may have a probability or selection rate s (0<s<1) of being selected for payment.

The merchant associates with the check C an item V that is substantially unpredictable by the user, for example a digital signature for C, created using a secret key of the merchant. The merchant then determines whether V satisfies a certain property P. In a preferred embodiment of the invention, the probability that V satisfies P is equal to the selection rate s. If merchant finds that V does indeed satisfy P, the merchant causes the bank to receive the information I that enables the bank to also verify whether V satisfy P. Otherwise, the merchant discards the check C. Upon receipt of I, the bank may verify the user's signature on the check C, if present, and discard the check if the signature does not verify. The bank may perform other tests, for example those relating to the status of the user's account at the bank, such as determining if the account is still in good standing (e.g., whether the relevant user's digital certificate has been revoked); the bank may choose not to honor a check if such tests are not passed. The bank then verifies that V does indeed satisfy P, and causes the merchant to receive a sum of money only if V satisfies P.

Referring now in more detail to each element of the micropayment scheme featured in the present invention, the "transaction" that causes the payment in the present invention covers a broad range of possible situations in which a user may have to pay a merchant. For example, the user may pay the merchant in order to purchase services, or information, or physical goods. Alternatively, the user may just be paying the merchant without making any purchases, for example in order to make a donation to the merchant. Examples of typical transactions T include, but are not limited to, the user visiting an informational website, web page by web page (each visited web page representing a single transaction T), or audio/video material being streamed to the user, minute by minute (each minute of streamed audio/video material representing a single transaction T).

The record T of the transaction may be a data string that includes the descriptive details of the transaction. For example, the record T may specify one or more of the following: the amount being paid; the description of the goods to be purchased, if any; the identities of the user and/or the merchant; the public keys of the user and/or merchant; digital certificates for the user and/or merchant; the date and time of the transaction; the identification of any relevant third parties, such as the bank or the financial services provider, and any additional information needed to identify the user's account. The transaction will hereinafter be referred to in terms of the record T that represents the transaction, namely the phrase "the transaction T" will be used to refer to the record T that represents the transaction.

The data string C derived by the user typically represents an electronic check (sometimes also called a payment order), which includes a commitment by the user to pay a given amount for the transaction. Typically, the nominal face value of the check C is the transaction value $T_V$ for the transaction T. Other information may also be included in the check C. For example, C may include the transaction T, or at least a portion of the transaction T, or an indication of the transaction T. In a preferred embodiment of the invention, the data string or electronic check C, or at least a portion of C, is authenticated. Authentication may be obtained by a variety of methods, as known in the prior art. For example, the check C may be authenticated via a digital signature, or via a message authentication code, or by virtue of being sent within an authenticated session. The check C may be authenticated by a party other than the user, for example upon request of the user, or on behalf the user. This method of authentication would be particularly useful in the context in which the user wishes to make an anonymous purchase. Any other authentication scheme known in the art is also within the scope of this invention.

The user may use secret information, known to user but not known to the merchant, when creating the check C. Typically, for someone who does not know this secret information, it is computationally infeasible to create the check C. In a preferred embodiment of the invention, the process of creating the check C involves the creation of a digital signature by the user in a public key digital signature system, and the secret information used by user to create C is his secret signing key in this system. In this embodiment, the data string C includes the user's digital signature of the transaction T in this system, conveniently denoted as $SIG_U(T)$. $SIG_U(T)$ is created by user using the user's secret key. The user may use any one of the digital signature schemes known in the art, in order to create his digital signature. In particular, the user's digital signature schemes may include, but are not limited to the following: a deterministic signature scheme; a randomized signature scheme; an identity-based signature scheme, as proposed by Shamir; an on-line signature scheme; an off-line signature scheme; and a designated verifier scheme. The string C may also include other information, such as information about the transaction T.

Having created the electronic check C, the user causes the merchant to receive C. There are a variety of ways in which the user may cause the merchant to receive C. The user may simply send the check C to the merchant. Alternatively, the user may ask another party to send the check C to the merchant. The user may cause the merchant to receive or access the check C in different portions, at distinct times. For instance, the user may cause the merchant to receive or access the user's public key at an earlier time, before any transaction T takes place. The user may then cause the merchant to receive or access the user's digital signature of C, or a portion of C, or a quantity related to T (or a portion thereof) at a later time.

The merchant may determine whether or not a check C is acceptable, i.e. whether or not the check C is in fact signed by user, and whether or not the contents of the check C are unadulterated and integral. To accomplish this, the merchant may review public verification information that is specific to the user who created the check C. This user-specific public verification information may be, for example, the user's public key that corresponds to the secret key that the user used in order to create C, or more generally a digital certificate proving that the user is authorized to make micropayments, and thus that his micropayments will be honored. The same digital certificate can be used for both purposes, that is indicate that the user is authorized to make micropayments and that a given public key should be used to verify his digital signature in a micropayment check. The merchant may use the user's public key, in order to verify that the digital signature on the check C is authentic, i.e. indeed created by user. If the user utilized an identity-based digital signature scheme, the public verification information may include a specification of the user's identity. Such user-specific public verification information may be obtained by the merchant directly from the user. Alternately, such public verification information may be obtained by the merchant from a digital certificate, or from publicly available information regarding the user (for example a published directory of public keys), or from information transmitted by the user in association with the check C or as part of the check C. The "user-specific public verification information" need not be available to the general public; it need only be available to the merchant(s) and the bank.

The merchant may take steps to check the authenticity of the user-specific public verification information that he obtained. These steps may include, but are not limited to: verifying digital signatures or other authentication information concerning the user-specific public verification information; verifying the signature on a digital certificate; checking the expiration date of a digital certificate; and determining whether a digital certificate has been revoked. The merchant may also confirm from the digital certificate that the user is indeed authorized to write the electronic check C; this may involve, for example, further checks on the amount, account number, serial number or other information in the check C.

The merchant associates with every check C that he receives an item V that is substantially unpredictable by the user. For example, the item V may be substantially unpredictable by the user because it would not be computationally feasible for the user to derive V from C, i.e., the user would need to perform an impractical amount of computation, in order to derive the value of the item V. In one embodiment of the invention, the item V can only be feasibly derived from C using secret information SI known to the merchant, but not known to the user. In one embodiment, the secret information SI may be merchant's secret key in a public key digital signature scheme.

In one form, the item V associated with C by the merchant may be the merchant's digital signature for C, denoted by $SIG_M(C)$ for convenience, and created by the merchant using a secret key of the merchant in a public key digital signature scheme. The digital signature scheme used by merchant does not necessarily have to be the same as the signature scheme used by the user to create C, and is likely to be a signature scheme that is different from the user's signature scheme. In this situation, if C is equal to, or includes, $SIG_U(T)$, then the item V may be given by: $V=SIG_M(C)$. Accordingly, $SIG_M(C)$ is a quantity unpredictable to the user, because the user can never know the merchant's secret signing key. Therefore, even if the user may control the check C in any way he wants, for example by choosing a particular transaction T, $SIG_M(C)$ will essentially be 'random', as far as the user is concerned. In another form of the invention, V may be a MAC (message authentication code) value, computed by the merchant using a secret MAC key; this MAC key may be known to the merchant and the bank but not to the user. In some forms of the invention, the merchant's signature of C may be construed to include the merchant's signature or MAC of only a portion of C (such as the date or time in C, a random string included in C, or the serial number contained in C), or of a quantity related to C.

The step of computing the item V need not necessarily follow in time the step of receiving C from the user. For instance, the item V may be the merchant's digital signature of the date information relating to the transaction T. The merchant may already have computed this digital signature before receiving C.

In the present embodiment, the merchant uses a selection procedure to determine which of the checks it has received should be "selected" for payment. The merchant transmits only the "selected" checks to the bank, and does not transmit any unselected checks to the bank. It is not computationally feasible for the user to determine, at the time the user creates a check, whether or not the check will be selected by the merchant or not. In fact, the user may or may not even be aware that the merchant uses a selection process and transmits only a fraction of the user's checks to the bank, although it may be more likely than not that the user eventually learns about such a selection procedure.

As part of the selection procedure, the merchant determines whether the item V associated with C satisfies a property P. In a preferred embodiment of the invention, the determination as to whether or not a check C is selected for payment hinges upon whether or not V satisfies P.

In a preferred form, the selection procedure used by the merchant is such that it is possible to estimate, for each selected check, its selection rate or "probability" of being selected for payment. In particular, the selection procedure may be one that is estimated to select a fixed fraction of all the checks. In this case, the property P may be related to a constant s, where 0<s<1, and where s is the probability that a given micropayment be selected for actual payment, and where this probability s is fixed and known. Alternatively, V may satisfy P with a probability that can be determined from the data string C or from a portion thereof, or from the record T or portion thereof, or from a combination of the data string C and the record T. In other words, the fraction of checks that are selected may depend upon parameters supplied by the user in the check C. For example, it may depend on the amount of the check. Alternatively, the value s may be specified within the user's digital certificate that binds the user's public key to the user. Alternatively, the property P may be guaranteed to hold for a constant fraction of the values of the item V. Alternatively, the property P may be guaranteed to hold for a certain fraction F of V, where the fraction F may be determined from the data string C, from the record T, from portions of C and T, or from a combination of C and T. Alternatively, the merchant may obtain information from the bank that can be used to determine s and/or the property P.

The property P may be specified beforehand, i.e. before the transaction T occurs and a check C is derived from T. An example of such a property P would be: "the last ten bits of V corresponds to a number less than x, where x is a constant number." Alternatively, the property P may be specified within, or obtainable from, the transaction T, or the check C, or a combination thereof. An example of such a property P would be: "the last 10 bits of V corresponds to a number less than the number corresponding to the last ten bits of C." The way in which the selection rate s is determined may involve a combination of the above approaches, or variations thereof that would be obvious to one skilled in the art.

In one form, the merchant may use the secret information SI known only to the merchant, in order to determine whether V satisfies P. Such secret information SI may include, for example, the merchant's secret key in a public-key digital signature scheme, or the merchant's secret key in a public-key cryptosystem, or the merchant's secret key in a public-key digital encryption scheme. Preferably, the merchant's digital signature algorithm should be deterministic.

In one embodiment of the invention, the property P may take the following form:

$$F(V)=F(SIG_M(C))<s, \tag{1}$$

where F( ) represents a public function that takes an arbitrary bit string as an input, and returns as output a number between 0 and 1, and s is a constant greater than 0 and less than 1 and represents (or at least determines) the selection rate for the micropayment scheme, i.e. the probability that a given check C be selected for payment. As one example, F might operate on a binary input string V by pre-pending a zero and a point, and interpreting the result as a binary number. In this example, if V were the input string "011," F would operate on V to yield "0.011," which would be interpreted as the decimal fraction ⅜. Since $SIG_M(C)$ is essentially a random (unpredictable) number, as explained above, then $F(SIG_M(C))$ is also a random and long enough number between 0 and 1. Therefore, $F(SIG_M(C))$ would be less than the rate s, and therefore the property P satisfied, essentially for a fraction s of all the checks C which the user causes the merchant to receive. In another embodiment, the function F would first apply a hash function or other deterministic function to its input, and then proceed as before by pre-pending a zero and point, and interpreting the result as a binary number. In another embodiment, the property P may take the following form:

$$F(V)=F(SIG_M(G(C)))<s, \qquad (1')$$

where G( ) represents a function that is applied to the check to produce a data string. For instance, the function G may just return the serial number of the check C.

It should be emphasized that the merchant need not interact with the user, in order to determine whether a check should be selected for payment. In a case in which the property P is determined according to equation (1), it is easily seen that merchant can immediately verify whether a check C is payable: the merchant can easily evaluate $F(SIG_M(C))$ using his own secret signing key, and compare $F(SIG_M(C))$ to the selection rate s. It is crucial that $F(SIG_M(C))$ be substantially unpredictable to the user; it should also be a number of sufficient precision. For a selection rate that is practically reasonable, for example 1/128 or 1/1024, it would be sufficient for $SIG_M(C)$ and $F(SIG_M(C))$ to be 10-bits long. A typical digital signature is, instead, hundreds of bits long, and therefore represents an overkill.

In this embodiment of the invention, the merchant causes the bank to access information I, which enables the bank to also verify whether V satisfies P, once the merchant himself has determined that the item V (for example $SIG_M(C)$) does satisfy the property P. In an exemplary embodiment of the invention, the information I may include the merchant's public key corresponding to the secret key that was used to create $SIG_M(C)$, or the merchant's certificate for that public key. The information I may also include the merchant's digital signature of C, namely V or $SIG_M(C)$. The merchant may cause part of the information I to be accessed by the bank before check C is even generated. For instance, the merchant may have given the bank in the past its own certificate, and the bank may have stored it. If the merchant determines that the item V derived from the electronic check C does not satisfy the property P, the merchant simply discards the check C. The bank never sees the check C. However, if the check were properly made, even though not selected for payment, the merchant would still normally provide the user with the goods/services that the check intended to buy. Only those checks C for which V (associated with C) satisfies the property P are selected for payment by the merchant, and forwarded to the bank. The bank is thus called into action only for a fraction of the micropayments made by user.

Because the bank is only seeing a fraction s of the checks created by the user and received by the merchant, an adjustment in the payment amounts needs to be made to account for (at least approximately) the value of the "missing" (unselected) checks. In one approach to) making such an adjustment, each check forwarded to the bank for deposit results in a "macropayment" that has a value of 1/s times the nominal face value $T_V$ of the check C. When s is variable, the applicable s is the s related to the procedure used to select C. For example, if s were 1/1000, and the transaction value $T_V$ were 1 cent, then on the average, only 1 out of 1000 micropayments would be selected for payment, and 999 out of 1000 micropayments would be discarded. A payment of 1000 cents, or $10, would be made for the selected micropayment. In this way, only a single processing cost would be incurred for each 1000 micropayments, on the average, resulting in a large savings in processing cost.

The bank verifies, for each check C received from the merchant, whether the check C should indeed have been selected for payment, using information I such as merchant' public key in merchant's digital signature scheme. In other words, for each check C received from the merchant, the bank also verifies whether V satisfy the property P, using information I. If the bank verifies that V does indeed satisfy the property P, the bank causes the merchant, or a designated fourth party other than the merchant, the user, or the bank, to receive a sum of money corresponding to the value of the macropayment. The bank typically causes the payment to be made out of the user's account, and into the merchant's account or into some designated fourth party's account.

The bank at its discretion and/or according to its policies, may refuse to pay for a check under certain circumstances, such as when the user's account is in arrears, when the user's certificate is revoked, or when the merchant or user is suspected of attempted fraud of some sort. For example, the bank may take steps to ensure that if a merchant submits the same check twice, then payment is made at most once. The bank may refuse to pay for a check that has been previously processed. The bank may also choose to hold a check for payment until the user has deposited sufficient funds in his account to cover the check.

The micropayment scheme featured in the first embodiment of the present invention may involve four parties, a first party, a second party, a third party, and a fourth party, where all four parties are totally distinct. As an example, the first party may be a user going through a tollbooth, the second party may be a device at the tollbooth, the third party may be the user's bank, and the fourth party may be the highway owner. Alternatively, the first party may be a user downloading a song, the second party may be a provider of the song, the third party may be the user's bank, and the fourth party may be a music distributor. Alternatively, the third party may be the first party (i.e. user)'s bank, and the fourth party may be the second party (i.e. merchant)'s bank. In this case, the second party would be causing the user's bank to make the payment to the second party's bank, for the second party's benefit. Additional parties, other than the first, second, third, and fourth parties, may also be involved in the micropayment scheme of the present invention. For example, the first party (user) may send a check C to a second party, which is a device that forwards the item V (if the property P holds for V) to a third party which is the user's bank. The user's bank (third party) pays the fourth party, which is the beneficiary's bank, for the benefit of the beneficiary, who is a fifth party.

The amount of the payment may depend on both the nominal face value ($T_V$) of the check and the estimated probability s that such a check would be selected for payment. The amount of the payment out of the user's account, and into the merchant's account, may be given by the nominal face value of the check, multiplied by the multiplicative inverse (1/s) of the estimated probability s that such a check would be selected, adjusted by any applicable bank processing fee that the bank may charge the user and the merchant, respectively.

As mentioned before, a micropayment scheme is very useful for enabling purchases of low-value items, for example a web article or a web page. In the prior art, subscription methods have been widely used, in order to enable users to purchase low-value items. For instance, by subscribing to a web service, the user essentially aggregates many future low-value transactions into a single macropayment. This practice, however, may not be optimal for the user, because the price of a subscription could be more than the user is willing to pay, if the user is currently interested in a specific item but is not sure that he will want or need to access future items. As a result, the vendor may lose some business, because the user may decide against buying a subscription (i.e. making a macropayment "in advance"), and may renounce his desired item.

A probabilistic micropayment scheme, as featured in the first embodiment of the present invention, may be extended in a manner that bridges subscriptions and individual sales, as follows. A merchant may offer users two options: 1) a subscription that enables the users to obtain many items within a given time interval (e.g., the subscription may offer a buyer the access to all web pages of the merchant, for one year), and 2) individual items à la carte. The user may decide to buy an individual item alone, according to its declared price, $T_v$. The user would pay the merchant with a probabilistic check having a face value of $T_v$, and the merchant would provide the user with the desired item. If the probabilistic check should be selected, however, the check will actually cause the merchant to receive a much higher monetary value, for instance $A=T_v*1/s$, where $s=1/1000$, in the case where the probability that an individual check be selected for payment is $1/1000$. The amount A, received by merchant, would exceed the cost of the merchant's subscription service. In this case, the user would be rewarded by obtaining a subscription for free. If the cost of a subscription is higher than A, the user may be rewarded by obtaining A as a credit towards the cost of purchasing a subscription from the merchant.

The above-described method for bridging subscriptions and individual sales offers several additional incentives to the user. Assume, for simplicity only, that all items have the same cost (e.g., one cent), that a subscription costs $10 and that the probabilistic check has a face value of one cent but upon selection for payment, actually ends up costing the user $10, because the probability for selection in the underlying scheme is $1/1000$. Then, the user will see that, on average, only 1 out of 1000 of his checks becomes payable, and that, when he actually pays $10, he also gets a subscription for free. Therefore, in some sense the user never has to decide whether he should purchase a subscription, or whether he should opt for à la carte items: the user may always go à la carte, because he would always end up, either with obtaining an item for free, or pay for the item, but have a subscription thrown in for free, in return. In this way, even if the user is hit with a $10 payment long before making 1000 1-cent purchases, the micropayment scheme would always appear fair and attractive to the user. The process would also look attractive to the merchant, since he may otherwise lose customers that would not consider buy a subscription anyway. The merchant can also adjust the per-value $T_v$ upward a bit to include a pro-rated cost of a subscription, if he feels that the user was getting too good of a deal.

Figure 2:
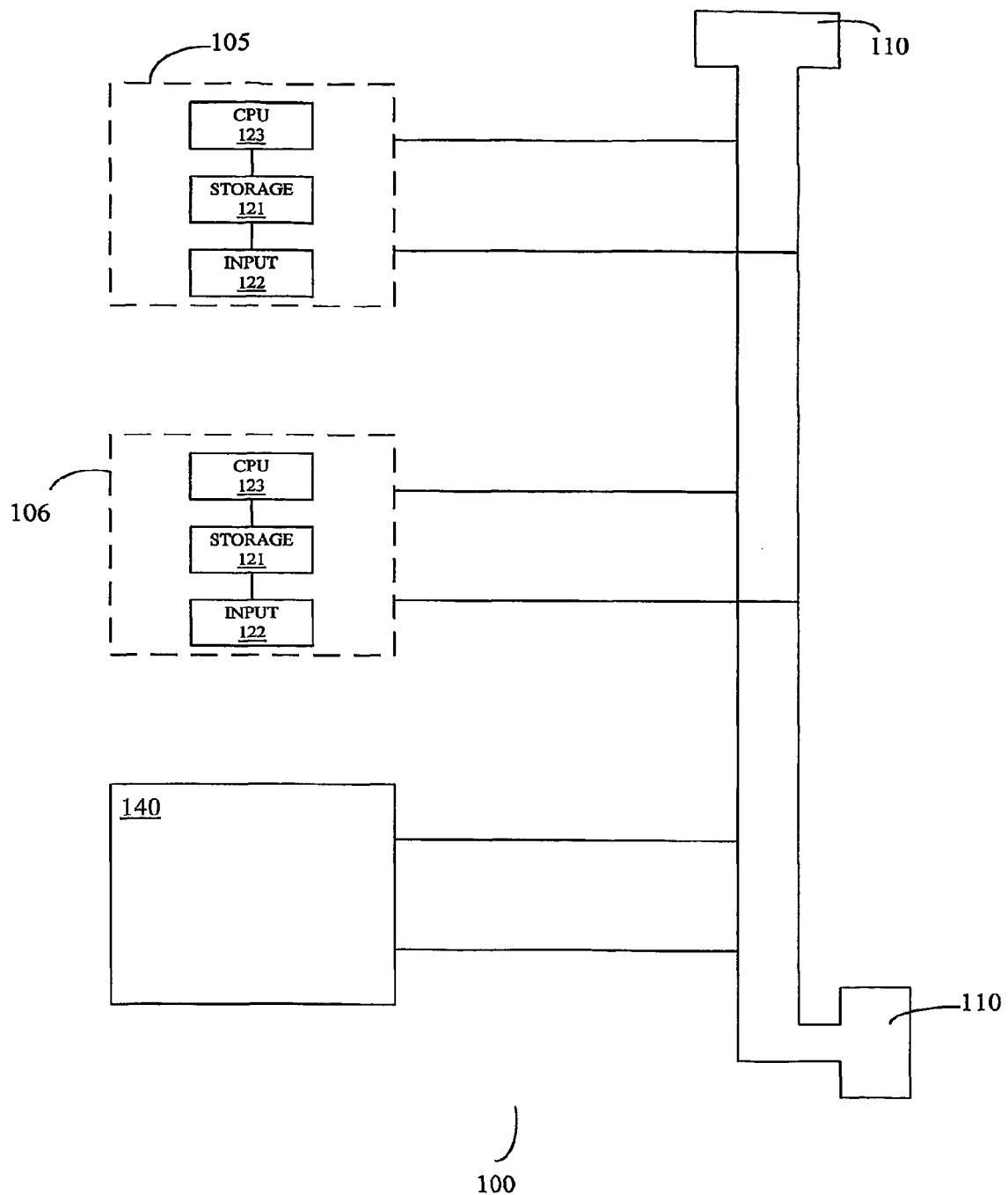
FIG. 2 provides a schematic block diagram illustrating the components of a micropayment system for establishing payment for a transaction, in accordance with the first embodiment of the present invention.

FIG. 2 provides a schematic block diagram illustrating the components of a micropayment system 100 for establishing payment for a transaction T, in accordance with one embodiment of the present invention. The system 100 includes communications means 110 that permit the user, the merchant, and the bank to transmit electronic data, and even payments, among themselves. The electronic data may include data strings that represent electronic checks, or strings that represent messages. In one embodiment, the communications means 110 may permit access to remote servers. The communications means 110 may include a modem, and one or more network interface devices known in the art, including but not limited to network interface cards. The communication means 110 may include buses, for example address buses 114 and data buses 115, that permit transfer of data between different network nodes.

The system 100 also includes a first processing means 105, and a second processing means 106. The first and second processing means may be computer systems, for example digital computers running a DOS or Windows operating systems, and are connected to the address buses 114 and the data buses 115. Each of the processing means 105 and 106 typically include storage means 121 for storing data, input means 122 for inputting data, and a Central Processing Unit ("CPU") 123 that implements the system commands. The storage means 121 may include a computer memory, and a data storage device such as hard disks, CD-ROMs, and the like. The input means 122 may be any input device known in the art, for example a conventional keyboard.

The first processing means 105 is operative by a first party for deriving, inputting and storing a data string C related to the transaction T. The second processing means 106 is operative by a second party and responsive to C, for associating an item V with at least a portion of C. The second processing means 106 is also operative to determine whether V satisfies a property P. For example, a set of instructions can be inputted into the CPU 123 of the second processing means 106, to cause the CPU to derive the item V associated with C (or a portion of C), and to cause the CPU 123 to determine whether V satisfies a property P. This is a necessary condition that must be satisfied, in order for the next step to be executed by the CPU 123, namely the ordering of the transfer to a third party (the bank) of information I enabling the third party to verify whether V satisfies P. The CPU 123 can be programmed to be selectively operative when V satisfies P, to transmit the information I to the third party.

The system 100 also includes means 140, selectively operative by the third party when V satisfies P, for causing a fourth party to receive a sum of money. The means 140 may also be a computer system, having a CPU that can be programmed to be selectively operative when V satisfies P, to order the transfer of a payment to a fourth party.

In summary, the micropayment scheme featured in a first embodiment of the present invention minimizes processing costs, while eliminating the need for user-merchant interactions, and while allowing each party to pay or receive approximately the correct expected value, over a period of time during which a relatively large number of micropayments take place.

II. Micropayment System Including Time Constraints

Different variants are possible within the non-interactive framework that is presented in the first embodiment described above. In particular, in a second embodiment of the invention, time constraints can be incorporated. The micropayment scheme, as described in the previous section, may allow a merchant to deposit a payable check at any time. In many cases, however, it is advantageous for the bank to have the capability to refuse to credit the merchant's account unless the merchant presents a payable (i.e. properly selected) check whose time information indicates that the check is being presented within a predetermined time interval from the time at which the relevant transaction occurred.

Figure 3:
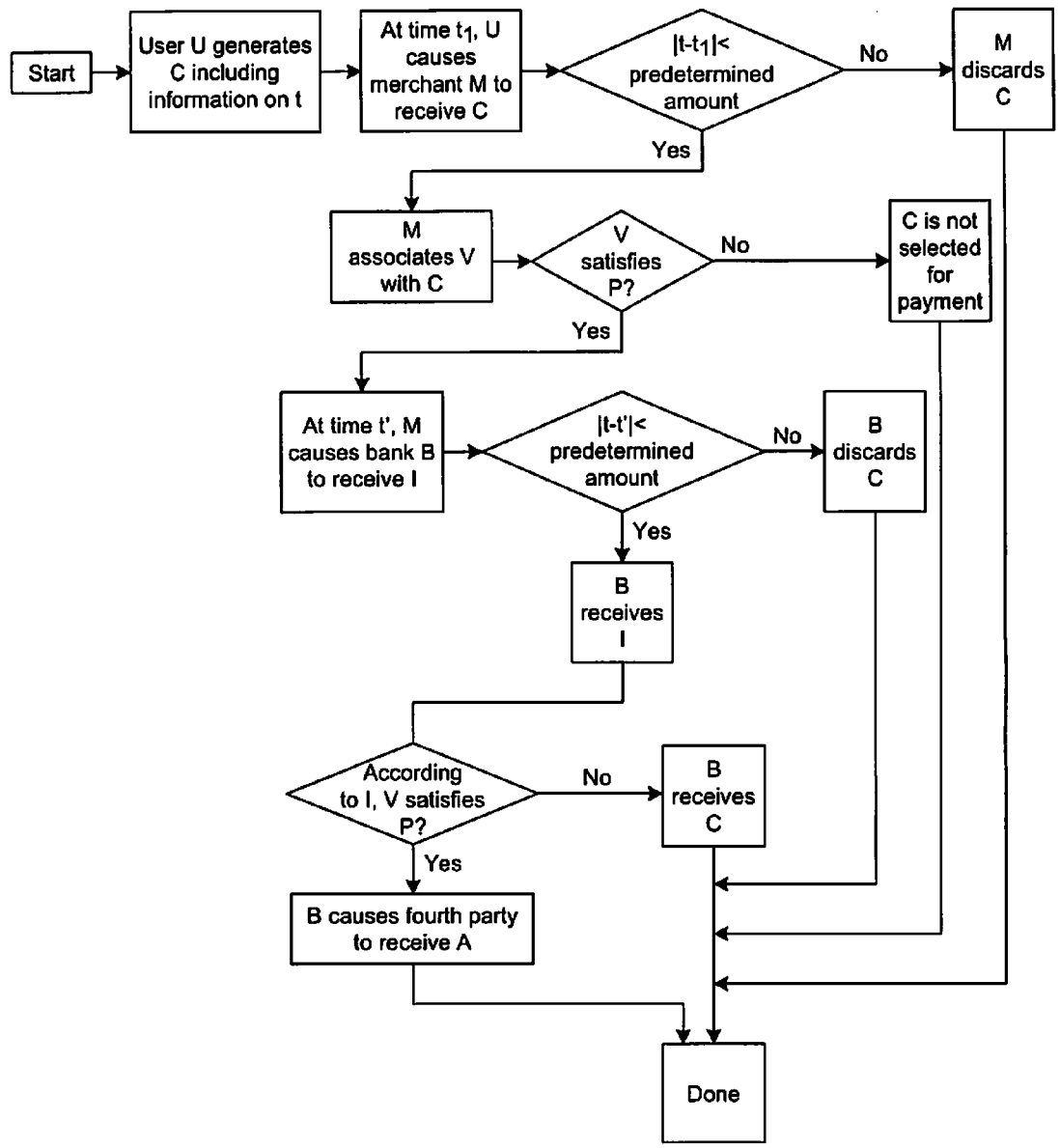
FIG. 3 provides, in flow-chart form, an overview of a method for micropayment transactions in accordance with a second embodiment of the present invention FIG. 4 provides, in flow-chart form, an overview of a method for micropayment transactions in accordance with a third embodiment of the present invention, which includes a selective deposit protocol that eliminates the risk to the user of being charged in excess of what he actually spent.

In the second embodiment of the invention, a micropayment scheme is presented which allows the user to establish payment for a transaction T that is characterized in part by a time t. Typically, the time t represents the time and/or date on which the transaction T occurred. FIG. 3 provides, in flowchart form, an overview of a method for micropayment transactions in accordance with a second embodiment of the present invention. The user derives from T a data string or electronic check C from the transaction T. In the second embodiment, the check C, or the transaction T to which C refers, must contain information IN regarding the time t of the transaction T.

The user causes the merchant to receive at least a portion of C that contains IN. The merchant, upon receipt of the portion of C, associates with C an item V that is substantially unpredictable by the user. In this embodiment of the invention, the substantially unpredictable item V is defined in terms of the time t of T. For example, V may be created using the merchant's secret key in a public digital signature scheme and may be given by $SIG_M(C)$, i.e. the merchant's digital signature for C or for the portion of C that includes information on t. In the latter case, more precisely $V=SIG_M(G(C))$, where G is a function of C that returns time information about C.

The parameter s and functions F and G may also be used in the micropayment scheme to determine the property P that V should satisfy. The manner in which s and the function F and G are specified, as well as the manner in which the property P is specified, may vary, in ways similar to the methods of specifying s, F, and P described in the previous section. For example, the check C (or the transaction T to which C refers) may directly specify the property P that should be used with the proper value V associated to C. For example, the function F may determine the property P, where P is given by:

$$F(V)=F(SIG_M(C))<s,$$

where s is a number between 0 and 1, and represents the probability that a given check C be selected for payment in the scheme.

In the second embodiment of the invention, the merchant's signature may just apply to a function G of C, rather than applying to all of C. That is, the property P may be given by $$F(V)=F(SIG_M(G(C)))<s.$$

Again, function G may be specified in one of several ways. For example, it may be fixed, or be specified by C, or be specified by the corresponding transaction T, or be specified by a certificate (e.g., of the merchant or of the user), or be specified in other information provided by the bank.

A particularly useful function G may be the function that returns the time information IN of C. In this way, the item V (substantially unpredictable by the user) is a function primarily of the time t of the transaction T, and therefore the property P depends primarily on the time t of the transaction T. Notice that the time information extracted by G may be related to but need not to coincide with t. For instance, t may specify the day, the hour, and the minute of T, while G may return a time indication with a different granularity: e.g., it may specify t itself, but just up to the day (or day and hour but not minute), or the next hour after t. In the second embodiment of the invention, the value G(C) being signed by the merchant should always be construed to include time information.

After determining that V satisfies P (in the cases where this is true), and that the check passes other tests (for example, whether the user's signature, if present, is valid, the merchant at time t' causes the bank to receive some or all of information IN regarding the time t of T. The merchant may present to the bank all of C, or at least a portion of the check C that contains IN. The merchant also causes the bank to receive information I enabling the bank to independently verify that V satisfies P. The merchant may cause the bank to receive part of I before V is even computed. After receiving the relevant portion of IN, the bank can determine whether t' (i.e. the time at which the merchant presented the check to the bank) is sufficiently close to t. The bank may discard the check C if the elapsed time |t'−t| is greater than a predetermined amount. The bank may also refuse or defer payment at its discretion or according to its policies if other conditions hold, such as when the user's signature on the check C does not verify, or the user's account is in arrears, or the user and/or merchant are suspected of fraud, etc.

Using I, the bank independently verifies that V satisfies P. Only if V indeed satisfies P, and all other tests are passed (such as the test that |t'−t| is less than a predetermined time interval) does the bank cause the merchant (or other fourth party) to receive a sum of money. The predetermined time interval may be one day, for example, or one week, or even a given number of hours.

As one example, if the transaction T to which a check C refers to happened in day i, then the micropayment system may require that the merchant deposit the check by the end of day i, or by the end of day i+1, or by the end of day i+n, where n is an integer number indicative of the number of days within which it makes business sense for the merchant to deposit. This type of requirement gives an extra incentive to the merchant to verify the time accuracy of the checks he receives, which provides an added security benefit to the merchant.

In one form, if $t_1$ represents the time at which the user causes the merchant to receive a portion of C including IN, then the merchant may refuse to proceed if the time $t_1$ is not within the prescribed time constraints. In such a case the merchant could refuse to provide the "merchandise" (goods, services, or information, for example) requested. Timely deposit also ensures that the user is not charged too late, i.e. when that possible expenditure is no longer in the user's budget.

Referring to G(C) in more detail, G(C) may be the function that returns the date and/or time information of C, or of the transaction T to which C refers. For instance, if such a date is 2001.01.01, then V may consist of $SIG_M(2001.01.01)$. This is substantially unpredictable to the user, if the merchant has never signed such a date before. In this case, the property P that V must satisfy includes comparing $SIG_M(2001.01.01)$ or $F(SIG_M(2001.01.01))$ with C, a portion of C, some function of C, or a pre-specified constant. For example, one such property P might be formulated as: does a selected m-bit substring of $SIG_M(2001.01.01)$ match a selected m-bit substring of C?

It should be noted that the above-described method of associating V with C has a number of advantages. In particular, the merchant may compute $SIG_M(2001.01.01)$ before even receiving C from the user on Jan. 1, 2001. Therefore, once C has been received that day, the merchant may much more quickly verify whether P satisfies the needed property P. For instance, if P consists of $F(SIG_M(2001.01.01))<s$, for some fixed number s, then P depends on V alone, and not otherwise on the check. Thus the merchant can determine whether P holds once and for all, and even before Jan. 1, 2001. If P does hold, then the merchant can forward (without any further verification) all the checks he receives that day to the bank, for payment. If P does not hold, he will discard (without any further verification) all the checks he receives that day. In this way, the number of signatures that the merchant has to perform is minimized.

Alternatively, the property P may consist of whether certain m-bits (say, 10-bits) of $SIG_M(2001.01.01)$ match a given 10-bit string that the user includes in C. In this case, even though the property depends on both V and the check C, determining whether P holds is almost immediate. In fact, even though the computation of a digital signature may be rather complex, the merchant needs to compute $SIG_M(2001.01.01)$ only once on or before Jan. 1, 2001, and then store the signature (or any given m-bits thereof). In this way, the merchant's effort that is required per check would only consist of a trivial comparison of two 10-bit strings. This enables the merchant to cause the bank to receive all of the information I enabling the bank to independently verify that a given check is selected for payment before the check is even received. For instance, the merchant may send $SIG_M$ (2001.01.01) at the beginning of Jan. 1, 2001, or even before it, and then just send the bank all checks relative to Jan. 1, 2001. Although convenient, this may not be prudent for the merchant, however, since if a malicious user were to gain possession of $SIG_M$(2001.01.01) during Jan. 1, 2001, she could write checks that day that would never be selected for payment. There are many variations of this approach (such as using a time granularity of one hour rather than one day) that are obvious to one skilled in the relevant art.

In one form, the second embodiment of the present invention allows the merchant to associate an item (substantially unpredictable to the user), using the time/date information on a check C, by deriving a sequence of values $VL_i$. The merchant derives a sequence of values $VL_i$ associated with a sequence of times $t_i$ (i=1, ..., n), at least one of which is related in a given manner to the time t of the transaction T. For instance, at least one integer m greater than 1 and less than n, $|t-t_m|$ is less than a predetermined amount, for example one day. Alternatively, for at least one integer m between 1 and n, $t-t_m$ (or $t_m-t$) is both positive and no greater than a day. The user causes the merchant to receive at least a portion of C that includes information regarding the time t of the transaction T.

The merchant then determines whether a property P holds between the portion of C, and the value $VL_m$, or between the portion of C and a quantity Q depending on the value $VL_m$ associated with $t_m$. If so, the merchant causes the bank to receive information I that enables the bank to verify that the property P is satisfied, so that the bank can make appropriate credits and debits.

In one form, the merchant may associate an item V (substantially unpredictable to the user) to each check C using the date information of C, by generating a chain of hash values. In this form, the merchant generates the chain of values:

$$w_0, w_1, \ldots, w_n,$$

where $w_i=h(w_{i+1})$ and h is a one-way function, and puts $w_o$ in his public file, or digitally signs it, or otherwise makes it public. The merchant thus associates to the i-th date/time unit. The associated item $w_{i+1}$ is unpredictable, even if the merchant reveals all items associated to prior time units. Although the first i such items may have been released by time unit i, $w_{i+i}$ is substantially unpredictable, because one cannot compute $w_{i+1}$ by just knowing $w_i=h(w_{i+1})$. The unpredictable item V that the merchant associates to a check C having time/date information i is $w_{i+1}$, i.e. the i-th hash inverse of the time/date information. The property P may then be formulated in a variety of ways. As one example, the property P may be satisfied if the first 10 bits of $w_i$ equal 10 selected bits of C. The merchant can enable the bank to verify whether property P holds by simply releasing the information $I=w_i$. The bank can verify $w_i$ by hashing $w_i$ i times and seeing whether the result matches the merchant's $w_0$, and then verify whether P holds.

It should be noted that if the merchant uses an unpredictable item V associated with the date/time information on the check, then it is better for the merchant to hide any information about those checks that he has discarded and those checks he has set aside for credit during a given day/time unit. Else, a malicious user may prematurely discover the values V, and use this information to his advantage, for example by generating checks that he knows will not be selected. It is preferable for the merchant to set aside all "selected" payable checks of a given date/time unit, and then send all the selected checks to the bank at the end the date/time unit. In this way, even a malicious bank cannot collude with a user so as to enable him to defraud the merchant. Security may also be enhanced by requiring users to utilize smart cards, cell phones, or other devices that make it difficult or impossible for a user to freely generate and test a variety of checks to determine which checks will turn out to be selected for payment.

III. Micropayment System Including a Selective Deposit Protocol that Eliminates User Risk It is typical of probabilistic payment schemes that the user does not know in advance, and has no control over, which of his checks will be selected for payment. In the embodiments of the present invention, as described so far, it may happen that a user is debited by an amount that exceeds what he actually spent, i.e. by an amount that exceeds the sum of the values of the checks he has written. In a traditional probabilistic payment scheme, if a check $C_i$ is selected to be payable with a probability s, then the user is typically debited for more than the transaction value $TV_i$: in many probabilistic schemes, he is debited by an amount ($TV_i*1/s$), by way of example. Thus, if each transaction $T_i$ has the same value $TV_i=TV$, and by bad luck two or more (rather than one) of the user's first 1/s checks become payable, then the user would be debited by an amount that is at least twice the actual amount that he spent. When s is large, this may be expected to happen for approximately one-quarter of the users.

In a third embodiment of the present invention, a selective deposit protocol is featured, which solves the problem of user risk, namely the possibility that a user by bad luck may be charged more than the total value of the checks that he has actually written. The problem of user risk is inherent in probabilistic micropayment schemes, such as Rivest's electronic lottery scheme, and the micropayment system disclosed in the previous section. For example, even though the selection rate s for a probabilistic scheme may be 1/1000, it may happen that by bad luck five, rather than one, of user's first 1000 payments are selected for payment. While the probability of excessively charging the user is small, and while the relative impact of user risk decreases dramatically with the number of micropayments made, user risk may constitute a strong obstacle to a widespread acceptance of probabilistic micropayment schemes. This is because ordinary users are not accustomed to managing risk, unlike larger institutions such as banks. Accordingly, the inventive scheme of the third embodiment, described below, improves the underlying probabilistic payment scheme.

Figure 4:
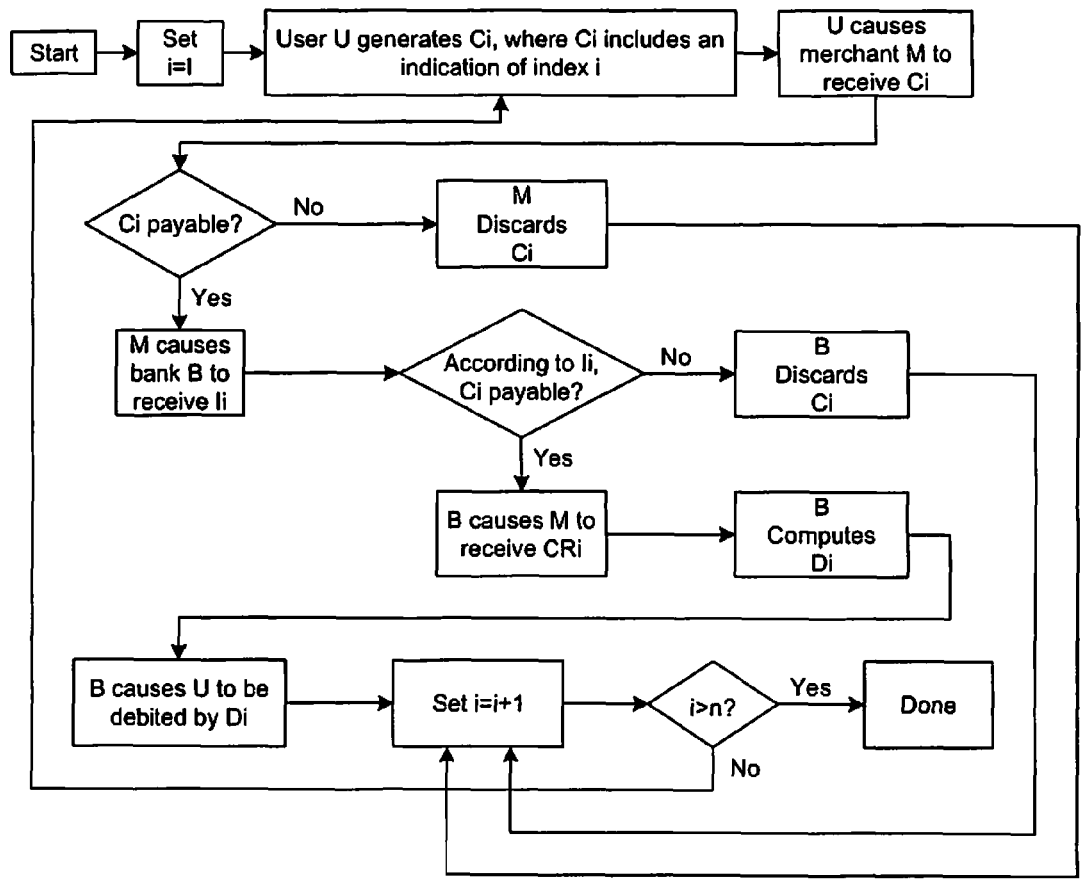

FIG. 4 provides, in flow-chart form, an overview of the method for micropayment transactions in accordance with the present invention, which includes a selective deposit protocol that eliminates the risk to the user of excessive payment. In this embodiment, a method and system is featured, which enables a user to establish payment for a series T; (i=1, . . . , n) of transactions. Each transaction $T_i$ is typically characterized by a transaction value $TV_i$ that is very low, for example one cent or a fraction of a cent. The bank would therefore incur processing costs much higher than the transaction value $TV_i$ itself, if the bank were to process every single transaction $T_i$.

A probabilistic micropayment scheme (e.g., Rivest's lottery scheme, or one of the schemes set forth in the previous sections) can therefore be used by the user to generate for each $T_i$ a check/micropayment $C_i$, which is sent to the merchant as payment for the transaction $T_i$. Then, with probability greater than 0 and less than 1, it may be determined whether $C_i$ is selected for payment, either by an interaction of the user and the merchant, as in Rivest's lottery scheme, or non-interactively by the merchant alone, as in the schemes described in the previous section.

As seen from FIG. 4, for each $C_i$ (i=1, ..., n), the user causes the merchant to receive $C_i$. For each $C_i$ that the merchant receives, the merchant determines, in accordance with the underlying probabilistic scheme and in a manner that prevents the user from predicting in advance which checks will be selected for payment, whether $C_i$ is selected (i.e. payable). For example, the underlying probabilistic scheme may be the scheme described in section I above, in which case the merchant will determine payability by associating an item $V_i$ with $C_i$, and determining whether $V_i$ satisfies a property $P_i$. The merchant may possibly check other conditions, such as whether the user's signature on $C_i$ is valid, whether the amount of the check is not too large, and so forth; some of these conditions may be specified in the user's certificate. If the merchant determines that $C_i$ is not payable, the merchant discards $C_i$. If the merchant) determines that $C_i$ is payable, the merchant causes the bank to receive information $I_i$, which enables the bank to verify that the selected check $C_i$ is payable. The bank uses $I_i$ to verify that $C_i$ is payable. If and only if $C_i$ is payable, the bank causes the merchant to receive a credit amount $CR_i$, and the user to be debited by an amount $D_i$.

In the third embodiment of the invention, the bank must ensure that $D_i$ is such that the total amount $D=D_1+D_2 \ldots D_i$ debited to the user is no greater than the total aggregate value $T_{agg}=TV_1+TV_2+\ldots TV_i$ of the checks the user has written. In other words, the total amount that a user is debited after he has participated in i transactions, for any integer i such that $1 \le i \le n$, must never exceed the aggregate value of the transactions $T_1, \ldots T_i$ that he has purchased from merchant.

In a preferred form, the bank determines $D_i$, in a manner that guarantees $D=D_1+D_2+\ldots+D_i$ to be no greater that $T_{agg}$, by using serial numbers from the checks. In this form, each of the plurality of checks $C_i$ (i=1, ..., n) generated by the user in the underlying probabilistic payment scheme includes a serial number $S_i$. These serial numbers $S_i$ are preferably consecutive integers starting from 1. Also, the i-th serial number is preferably representative of the order in time of the transaction $T_i$ and the check $C_i$, relative to the other transactions ($T_1, \ldots, T_{i-1}$, and $T_{i+1}, \ldots T_n$) and the other checks ($C_1, \ldots, C_{i-1}$, and $C_{i+1}, \ldots C_n$).

The serial number $S_i$ provides an indication of the index i associated with the transaction $T_i$ and/or the check $C_i$. Ordered but non-consecutive serial numbers can also be used, however. For example, one may associate with the i-th check the i-th prime number, after a given number P. For simplicity, the case in which each transaction $T_i$ has the same transaction value $TV=TV_i$ will be described first. The third embodiment also encompasses cases in which the transactions $T_i$ may have different values $TV_i$, as discussed in more detail later.

The bank (or another fifth party) keeps track of the serial numbers of the checks that have been selected for payment. In order to determine the debit amount $D_i$ of a payable check $C_i$, the third/fifth party uses the value $S_{max}$, where $S_{max}$ denotes the serial number appearing on the most recent check that has been presented, so far, for payment. The value $S_{max}$ is initialized to zero in the case that the serial numbers are used sequentially starting with 1. Because the serial numbers on the checks are sequentially ordered, $S_{max}$ is the largest of the serial numbers appearing on any check that has previously been presented for payment. Also, $S_{max}$ is less than the serial number $S_i$ of the current payable check $C_i$, because of the sequential ordering of the serial numbers. As shown in FIG. 4, the user is debited (e.g., by the fifth party) for this check by an amount $$D_i=(S_i-S_{max})*TV. \quad (1)$$

It follows that the total amount D the user has been debited for all of the checks he has written is $S_i*TV$. If non-consecutive serial numbers are used, one may define $D_i=\#(S_i-S_{max})*TV$, where $\#(S_i-S_{max})$ denotes the number of serial numbers between $S_i$ and $S_{max}$ (inclusive of $S_i$ but exclusive of $S_{max}$).

The amount $D=D_1+D_2+\ldots D_{max}$ represents the aggregate value of all the checks that user has issued. Since D is never more than $i*TV$ after i checks have been written, the risk to the user of making an excessive payment is thus eliminated. In order to process future micropayments, the bank then resets the value of $S_{max}$ to $S_i$, which as explained above is the most recent check found by the bank so far to be payable. Equation (1) also shows that the amount ultimately charged to the user does not depend on which checks ultimately turn out to be payable, but only on the number of checks that the user has written; the user is eventually charged the proper amount for each check he has written.

The fifth party may cause a fourth party (which may be the merchant, or may be an entity other than the merchant) to receive a credit amount $CR_i$, which typically is given by:

$$CR_i=TV*(1/s). \quad (2)$$

If there is a selection rate s in the underlying probabilistic payment scheme, then also in the method and system of the present invention, approximately only 1 out of every 1/s checks becomes selected for payment, when averaged over a large number of micropayments. Accordingly, the credit amount is fair to the merchant, too, since it is the full aggregated value of the 1/s checks, and the merchant ends up receiving the correct amount, when an average is made over a large number of micropayments. But the resulting scheme is much fairer to the user, because the risk of making an excessive payment is shifted from the user to the bank. For example, if the selection rate is $s=1/1000$, and the merchant deals with 1,000 micropayments, each worth one cent, then it is expected that only one of these 1,000 payments will be selected, but the selected one will cause the merchant to receive $1/s=1000$ cents, or \$10. If more than one micropayment (out of 1,000 micropayments) is selected, the bank will, by bad luck, have to pay \$10 more than once. The bank may choose to shift some risk to the merchants by deferring payment on a check to a merchant until the user has paid enough in aggregate, according to the serial-number debiting scheme described above, to cover the payment of this check and of all previous checks also selected for payment.

In this third embodiment of the invention, the user may preferably have obtained a certificate from his bank authorizing the user to write checks on the user's account at the bank. This certificate may specify the user's public key; it may also specify other information such as the maximum serial number the user is authorized to use, and/or the maximum amount of a check (if the checks may have variable value). The user may send this certificate with each check he writes, or may only supply it to merchants to whom he has not sent it recently. Some bandwidth savings can be obtained by having the merchants cache the user certificates for a certain amount of time.

In another variant of this embodiment of the invention, the maximum serial number Y the user is authorized to use may be specified by using a hash chain of length Y, in a manner similar to the way in which a PayWord certificate specifies the root of a hash chain of length Y authorizing a sequence of Y micropayments to a particular merchant. In this case, however, the checks with the authorized serial numbers may be written to any merchant. The user can supply the merchant with the certificate and the i-th element of the hash chain to prove that he is authorized to write a check with serial number i. (The i-th element of the hash chain is defined to be the element of the hash chain which, when hashed successively i times, yields the root of the hash chain.)

The merchant may also have a digital certificate, which the user may or may not obtain during the payment protocol, depending on which version of the protocol is used. If the payment protocol is indeed non-interactive, the user may have difficulty obtaining this certificate. On the other hand, this certificate is not essential for the payment protocol. For example, the user's check could include a statement of the form "This check is only valid when deposited in conjunction with a valid certificate for the merchant's public key," or the like, and the merchant could supply the bank with its certificate when it deposits the check.

For several reasons, it is preferable to shift the risk of excessive payment from the user to the bank, or to the merchant. First, the probability that checks are selected significantly more often than one out of 1/s times is small. Thus, excessive payments by the bank occur only rarely. In any event, the amount of each such excessive payment is quite modest. The bank can also adopt strategies such as charging each user a fixed fee (for example, a fee proportional to 1/s) when opening an account, to cover such variations. While a small risk of a moderate amount of excessive payment may bother individual users, and discourage them from signing up with probabilistic micropayment schemes such as the one disclosed in the present invention, such a risk will generally not bother banks. The reason is that banks are accustomed to managing substantial risk. As just one example, a risk routinely managed by banks is the risk of borrowers defaulting on their loans. Thus, banks are institutionally well-suited to supporting payment systems wherein they can make a profit by accepting and managing risk.

Similarly, merchants are typically used to managing large numbers of transactions, where each transaction has some associated risk, such as the risk that the goods will be returned or that the user's payment will not materialize. Therefore, it may also be acceptable to the merchants to accept some risk in a micropayment scheme. The bank and the merchant might thus agree, for example, that a micropayment check selected for payment will not actually be paid to the merchant until the user's account contains sufficient funds to cover it. Each check selected for payment would be held in a "pending queue" at the bank until the user's payments (determined according to the serial-number scheme described above) are sufficient to cover this check and all previously queued checks.

Second, the probability of an excessive payment becomes less and less in the long run, i.e. the risk decreases as the number of micropayment transactions increases, as long as there is a small per-transaction fee levied by the bank, no matter how small. The probability of excessive payments is therefore smaller for a bank, as compared to the probability for an ordinary user, because banks generally experience much higher volumes of transactions, as compared to a single user.

Besides eliminating the risk of excessive payment by the user, the third embodiment of the present invention also enables the bank to punish cheating parties, or purge them from the system before they can create any substantial damage. As explained in more detail below, the present invention includes several features that permit the bank to prevent a malicious user and/or a malicious merchant from cheating. For instance, if the bank notices that a new check has the same serial number as a previously processed check, or if the new check's serial number and time are somehow out of order with respect to previously processed checks, or if the amount of the check is excessive, or if other bank-defined conditions occur, then the bank can refuse to honor the check. The bank may even fine the user, and/or take other punitive actions, as it deems appropriate. For instance, the bank may keep statistics and throw out of the system—e.g., by revoking their certificates if certificates are used—users whose payable checks cause any of the problems described above. For example, checks may be thrown out if they are inconsistently numbered and/or dated, or if they belong to users whose checks are more frequently payable than expected. Similarly, the bank may throw out of the system merchants who misbehave, such as merchants who receive for payment checks with the above-mentioned problems, or checks which are more frequently payable than statistically expected.

In the third embodiment of the present invention, users are required to use the serial numbers in order, and without repetition. For example, serial number 1 should be used for the first check, serial number 2 should be used for the second check, and so forth. As described above, in this way the user will never be charged more than he should. Typically, at a given time, after the last payable check he will have written a few more checks for additional transactions which were not selected for payment. Therefore, at least for a while, he is debited less than he actually spent, and occasionally will be debited by exactly the amount he should be debited, i.e. when the latest check is actually payable.

A dishonest user, however, may try to play with the serial numbers so as to find ways to be debited by an amount less than what he actually spent. One way is to re-use a serial number more than once. If he does this, the quantity $S_i - S_{max}$ and thus the amount given by $(S_i - S_{max})^*TV$ will be reduced, compared to its true value. This kind of cheating will not be very useful, however, because if the bank notices that a payable check has the same serial number as a previously processed check, the bank could take punitive measures designed to prevent such cheating. For example, if the bank encounters a duplicate serial number in a payable check, the bank could be authorized to debit the cheating user an amount so high that it will be counterproductive for the user to in cheat this way.

It should be noted that in the micropayment scheme featured in the third embodiment of the present invention, the user cannot predict and thus cannot control which of his checks will become payable. Thus each time he generates two checks having the same serial number, there is a chance, albeit small, that both of them will become payable. The penalty for being caught cheating can be set high enough that it more than offsets what he could hope to gain by cheating.

Several forms of cheating may involve "back-dating" of checks and the like. It is thus important for the merchant and the bank to check that, for any two checks C and C' seen from the same user, if the serial number of C is less than the serial number of C', the date/time of C is before the date/time of C'.

The above-described mechanism for catching a user who is cheating works better if the user is not told by the merchant which of his checks become payable, immediately after the payment transaction. In fact, from this view point, it would be preferable to keep the user as ignorant as possible about which of his checks has become payable. In principle, the user can in fact monitor exactly how many checks he has written, and thus will not dispute an honest debit. However, if a dispute should arise, then the ability to present proof of the amount debited, including the serial number of the payable check, would be desirable.

The above-described mechanism for searching out and throwing out cheating users can be improved, if the criterion for selecting a check $C_i$ for payment depends solely on the serial number $S_i$. In this way, if a check is payable, so is any other check which is generated with the same serial number by cheating. For instance, if the underlying probabilistic payment system is as disclosed in the previous section, the quantity $V_i$ (unpredictable by the user) used to determine (via the property P) when a check is payable, can simply consist of the merchant's signature of $S_i$ alone, together perhaps with the user's account number and/or name, rather than the merchant's signature of the whole $C_i$.

Another way in which the user may try to pay less is to use serial numbers in a sequence that is out of order with their times of use. For instance, once a malicious user becomes sure that $S_{100}$ is the lowest serial number of a payable check, he may plan to start re-using serial numbers $S_1$ through $S_{99}$, so as to be assured that the checks he uses will not be selected for payment, while at the same time not fearing that he will be caught using the same serial number twice. Even with this kind of game plan, however, the malicious user still has a good chance of being caught. The reason is that if he later (i.e. after using $C_{100}$) re-uses a serial number between 1 and 99, he cannot prevent the illegitimate check from becoming payable. This will occur with some positive probability, and, if it does, the bank will notice that check $C_{100}$ was payable relative to a transaction $T_{100}$ having a time $t_{100}$, and that the user has later generated a check having a serial number less than $S_{100}$ for a transaction whose time is later than $t_{100}$. Again, the resulting sanction by the bank may make it counterproductive for the user to cheat this way. In order for this kind of screening mechanism to work smoothly, it is preferable that each check carry an indication of the time of the transaction it pays for, and that the merchant disregard as invalid, before the selection process begins, those checks carrying a wrong time-indication.

To support this anti-fraud strategy better, the bank may require merchants to use a selection procedure that is designed to contain, by way of example, both a component that depends only on the serial number of the check, and a component that depends only on the time. Another component could depend on the entire check. In essence, there could be two or more selection procedures, and the check may be selected if the outcome of any one of them determines the check to be selected. Such variations should be obvious to those skilled in the relevant art.

A malicious user U' could also collude with a malicious merchant M', so as to ensure that a check signed by U' and spent for goods/services/information provided by M' is always payable. This way, assuming for simplicity that each payment value is 1 cent, U' will always be debited just 1 cent by the bank, while M' will always be paid 1/s cents (i.e., $10 if s=1/1000). Then U' and M' may share their illegal proceeds: indeed, U' may coincide with M' if he sets himself up as a merchant (perhaps under a pseudonym)!

Nonetheless, U' and M' may only make a modest illegal gain: if they try to boost their illegal gain, by repeating the above-described method several times, they are likely to be thrown out of the system. This is a high price to pay, particularly if M' also has legitimate gains in the system. If it is not easy for thrown-out users and merchants to come back in the system, e.g., under a new identity, or if the price needed to enter the system in the first place (e.g., the price for obtaining an initial certificate) is sufficiently high, this illegal game pays little. It may even have negative returns to the user, and the costs involved may easily be absorbed by the bank.

In any case, this kind of cheating may be eliminated by having the first party use secure hardware. This untamperable component may, for instance, be responsible for properly incrementing the serial number each time a new check is generated, and possibly also for keeping safe the secret signing key and for generating the signature component of a new check. Thus if a malicious user tries to generate a check that is payable to his merchant accomplice, at every trial he must also increase the serial number. Thus, once a payable check is generated, the merchant will be paid a given amount, but the user will also be debited a corresponding proper amount. It should be noted that anywhere in this disclosure a party may use, and/or be required to use, secure hardware for performing at least part of its operations. Such secure hardware may, in particular, be included in a smart card or mobile phone.

A small probability exists that an honest user may appear to be malicious, because after he writes n checks, significantly more than n*s of them have become payable, just by chance. In this case, he may be thrown out. With appropriate parameter settings, there will be very few such users. In addition, it is possible to communicate to these users that they unintentionally caused losses to the bank. For example, the bank can present the users with information that reveals that an unusually large number of their checks were found to be payable, and that explains why so many of their checks actually were payable. As a consequence, these users may accept to stay in the micropayment system under different conditions—for example, as users of a probabilistic payment system in which the user bears the risk of being debited by an amount greater than the amount he actually spent. Such a transition might even be incorporated as an automatic feature in the original agreement between the user and the bank.

As noted earlier, the bank may shift to the merchant some of the risk associated with statistical variations, and now also some of the risk associated with user cheating, by deferring payment of checks selected for payment until such time as the bank has received from the user sufficient funds to cover this check (and all previous checks from that user selected for payment). The bank will be receiving funds from the user systematically according to the number of checks the user has written, and the bank will be receiving checks from the merchant that have been selected for payment, according to the present invention as described above. When the user is honest and writing checks frequently, the merchant in this scheme should not have to wait long for payment from the bank. Also, if the bank pays the merchant not the full value of each check, but a slightly discounted amount, then the user's account should typically be paid up (or nearly so), as the rate of user payments will somewhat exceed the rate of bank disbursements. In this case a merchant should expect payment immediately or only after a short delay. Shifting risk to the merchant in this manner may be a particularly effective way of discouraging users and merchants from attempting to collude in an effort to defraud the bank, since the bank no longer assumes any risk that the disbursements made for the user's checks selected for payment will exceed the receipts from the user. If this variation is adopted, it may be useful for the bank to indicate in the user's certificate the total value of the "pending, unpaid" checks associated with the user's account, so that a merchant may decline to accept a user's check if this amount seems excessive.

The method and system of the third embodiment of the present invention also enable one to handle micropayments that do not have a uniform, fixed transaction value. One method would be to treat a check worth v cents explicitly as a bundle of v one-cent checks, with consecutive serial numbers. A more efficient method is for the user to write a single check that is characterized by a serial number interval, [S, S+v−1] (inclusive of both endpoints S and S+v−1), instead of being characterized by a single serial number. If this check becomes payable, the user will be debited by $S+v-1-S_{max}$ cents, and the new $S_{max}$ will become S+v−1.

In this third embodiment of the present invention, the process by which a check is determined to be payable may depend on the value of the check, when checks of varying value are supported. That is, instead of a single selection probability s, there is a selection probability $s_v$ for each integer v greater than zero, and these probabilities may differ. The procedure may use a simple "step function" of the form: a check for v cents is payable with probability 1/100 if v is less than 100, and with probability one if v is 100 or greater. Alternately, a "ramp function" could be used: a check is payable with probability v/1000 if v is at most 1000, and with probability one if v is at least 1000. However, the use of schemes may interact unfavorably with the ability of the bank to detect various forms of fraud, so they should be used with caution. For example, the bank can no longer so easily predict the amount that should have been paid out to merchants so far, given only the maximum serial number seen. For this reason, it may be desirable to keep the selection probability fixed. In this direction, one attractive approach would be for the bank to issue to the user two or more certificates, each certificate specifying its own set of allowed serial numbers, its own maximum payment size, and its own selection probability s. In essence, the user then has a set of distinct "checkbooks", each with its own parameters and limits, but each with its own selection probability s.

Referring to the non-equal transaction value case in more detail, the third embodiment of the present invention allows a user to establish payment for a plurality of n transactions $T_1$, $T_2$, ..., $T_n$, where each transaction $T_i$ is characterized in part by an integer index i and a transaction value $TV_i$, and where each $T_i$ need not be of equal value, but each $TV_i$ can be characterized as a multiple of a common unit value UV. UV may be, for example, 1 cent. In this case, each data string $C_i$ includes information on the integer index i, and the value $TV_i$ of $T_i$. The information takes the form of a pair of values ($S_i$, $S_i+v_i-1$) consisting of the "initial serial number" and "final serial number" for that check. For all i between 1 and n, $S_i$ is a progressive serial number that is sequentially ordered, and that is representative of a position of $C_i$ relative to other data strings in an ordered succession of data strings $C_j$ (j=1, ..., n). $v_i$ is an integer depending on i and indicative of the value $TV_i$ of $T_i$, and is given by $v_i=TV_i/(UV)$.

The merchant selects from the received checks $C_j$(1≤j≤n) those that are payable in a manner that prevents the user from predicting in advance which checks $C_j$ will be selected to be payable. In one form, the merchant may use the method described in section I, namely associating an item $V_j$ (such as the merchant's digital signature of $C_j$ produced using the merchant's secret key) with $C_j$, that is substantially unpredictable to the user. The merchant causes a third party to receive information $I_j$ enabling the third party to verify that a selected check $C_j$ is payable. The third party, in response to receipt of $I_j$, verifies that a selected check $C_j$ is indeed payable. If and only if $C_j$ is payable, and perhaps if some other conditions are met as well, a fifth party determines the value of $S_{max}$ and $v_{max}$, where max is an integer such that 1≤max<i≤n, and $v_{max}=TV_{max}/(UV)$. $S_{max}$ represents the largest final serial number of any check selected so far for payment. The fifth party then causes a fourth party (who is the payee, and may be the merchant or another party) to receive a credit amount CR.

The fifth party causes the first party to be debited by a debit amount related to $D_i$, where $D_i$ is given by:

$$(S_i+v_i-1-S_{max})*UV.$$

$S_{max}$ is then set to be $S_i+v_i-1$.

Cheating in the case of non-uniform transaction values is caught, and dealt with, using methods similar to the case of fixed transactional values. For instance, two payable checks, one for a single cent and characterized by a serial number S' between S and S+v−1, and another for v cents and characterized by a serial number interval [S,S+v−1], would in this case be considered a proof of cheating. Checks for too high values of v may be disallowed, i.e. always refused payment. Otherwise, a malicious user could join the payment system, write a single check for a huge amount, and, if it turns out that the check was not selected for payment, never generate a second check. This issue can also be dealt with by charging each user an "initiation fee" when he establishes an account, such an initiation fee being large enough to cover the expected maximum "float" for that user. Here the "float" is the expected maximum value in checks which the user has written but which the bank has not seen. For some forms of this invention, this float can be computed as the maximum size of a check that the user may write, times the multiplicative inverse of the probability that a check will be selected for payment. The bank may also discourage cheating, as noted earlier, by deferring payment on checks selected for payment until the bank has received sufficient funds from the user to cover this check (and previous checks written by the user that were also selected for payment).

In one form, the method and system of the third embodiment, which guarantee that a user is never charged more than what he actually spends, can be implemented with an underlying probabilistic payment scheme that has been described in the section I. In this case, upon receiving a check $C_i$ for a transaction $T_i$ (i=1, ..., n), the merchant associates with the check $C_i$ an item $V_i$ that is substantially unpredictable by the user, for example the merchant's digital signature for $C_i$ or for a portion of $C_i$, $SIG_M(C_i)$, created using the merchant's secret key. The merchant then determines whether $V_i$ satisfies a certain property $P_i$, for example the following property:

$$F(SIG_M(C_i))<s, \qquad (3)$$

where F is a function that operates on a bit string and returns a number between 0 and 1, and s is the selection rate (0≤s≤1).

If merchant finds that $V_i$ does indeed satisfy $P_i$, the merchant causes the bank to receive the information $I_i$ that enables the bank to also verify whether $V_i$ satisfy $P_i$, for example the merchant's public key corresponding to the merchant's secret key that was used to generate $V_i$. If $V_i$ does not satisfy $P_i$, the merchant discards the check $C_i$. If and only if the bank finds that $V_i$ does indeed satisfy $P_i$, and perhaps that $V_i$ also satisfies other conditions determined at the discretion of the bank, a fifth party (which may be the bank, or an entity other than the bank) causes a fourth party (which may be the merchant, or an entity other than the merchant) to receive a credit amount, $CR_i$. The fifth party also causes the user to be debited by a debit amount $D_i$.

In the third embodiment, the amount $D_i$ charged to the user is not necessarily the same as the amount $CR_i$ received by the merchant (or other entity). However, the method of the third embodiment distinguishes itself from the underlying probabilistic payment scheme, by including a selective deposit protocol, which ensures that the amount $D_i$ by which the user is debited is never more than the amount that the user has actually spent, in the aggregate, by writing his checks. More specifically, the selective deposit protocol guarantees that, in aggregate, the debited amounts are always no greater than the corresponding transaction values. In other words, the user is assured of never being charged in excess of what he actually spends.

Figure 5:
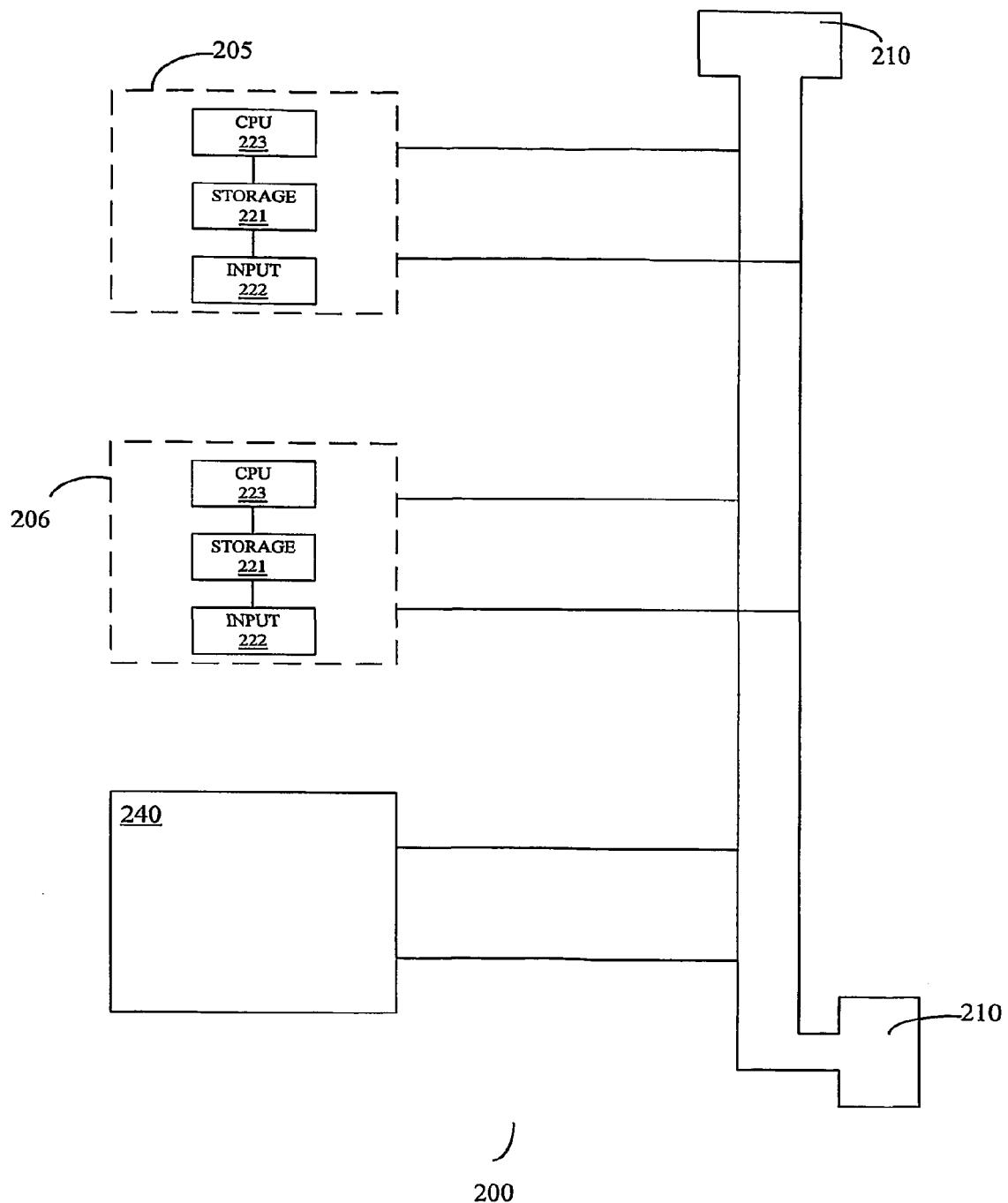
FIG. 5 provides a schematic block diagram illustrating the components of a micropayment system for establishing payment for a transaction, in accordance with the third embodiment of the present invention.

FIG. 5 provides a schematic block diagram illustrating the components of a) micropayment system 200 for establishing payment for a transaction $T_i$, in accordance with the third embodiment of the present invention. The system 200 includes communications means 210 that permit the user, the merchant, and the bank to transmit electronic data, and even payments, among themselves. The electronic data may include data strings that represent electronic checks, or strings that represent messages. In one embodiment, the communications means 210 may permit access to remote servers. The communications means 210 may include a modem, and one or more network interface devices known in the art, including but not limited to network interface cards. One or more buses, for example address bus 214 and data bus 215, may be provided so as to permit transfer of data between different network nodes.

The system 200 also includes a first processing means 205, and a second processing means 206. The first and second processing means may be computer systems, for example digital computers running a DOS or Windows operating systems, and are connected to the address buses 214 and the data buses 215. Each of the processing means 205 and 206 typically includes storage means 221 for storing data, input means 222 for inputting data, and a Central Processing Unit ("CPU") 223 that implements the system commands. The storage means 221 may include a computer memory, and a data storage device such as a hard disk, a CD-ROM, and the like. The input means 222 may be any input device known in the art, for example a conventional keyboard.

The first processing means 205 is operative by the user for deriving, inputting and storing a data string $C_i$ related to a transaction $T_i$ (i=1, . . . , n), including in the data string $C_i$ a progressive serial number $S_i$ that is representative of the position of the check $C_i$ relative to other checks in an ordered succession of checks $C_j$ (j=1, . . . , n). The second processing means 106 is operative by the merchant and responsive to $C_i$, for associating an item $V_i$ with $C_i$. The second processing means 106 is also operative to determine whether $V_i$ satisfies a property $P_i$. For example, a set of instructions can be inputted into the CPU 223 of the second processing means 206, to cause the CPU to derive the item $V_i$ associated with $C_i$ (or a portion of $C_i$), and to cause the CPU 223 to determine whether $V_i$ satisfies a property $P_i$. This is a necessary condition that must be satisfied, in order for the next step to be executed by the CPU 223 in 206, namely the ordering of the transfer to the bank of information $I_i$ enabling the bank to verify whether $V_i$ satisfies $P_i$. The CPU 223 in the processing means 206 can be programmed to be selectively operative when $V_i$ satisfies $P_i$, to transmit the information $I_i$ to the bank.

The system 200 also includes means 240, selectively operative by the bank (or another fifth party) when $V_i$ satisfies $P_i$, for causing a fourth party (which may be the merchant, or another entity) to receive a sum of money. The means 240 may also be a computer system, having a CPU that can be programmed to be selectively operative when $V_i$ satisfies $P_i$, to: 1) determine the value of $S_{max}$, where $S_{max}$ is the serial number of the last check upon which payment was made (and thus the largest of the serial numbers on any check presented to the bank so far for payment); 2) order the transfer of a payment of amount CR to a fourth party; and 3) cause the user to be debited by an amount D.

In sum, the micropayment system and method of the third embodiment of the invention provides a mechanism for guaranteeing that the user never be charged more than what he actually spends. In this way, the system and method presented in the third embodiment significantly enhances user acceptance, which is a key factor in effecting widespread acceptance of micropayment schemes.

IV. Micropayment System Including a Deferred Selection Protocol Controlled by the Bank The fourth embodiment of the present invention features a probabilistic micropayment scheme including a deferred selection protocol, in which the payment selection process is deferred until the bank receives from the merchant a commitment to one or more checks. There are several methods of accomplishing such a deferred selection protocol. A first (and preferred) method is as follows: A user creates a data string or "electronic check" C, derived from a micropayment transaction T and providing an adequate indication of the time t of the transaction, and sends C to the merchant, when the user wishes to make a payment. The merchant groups the checks $C_i$ (i=1, . . . , n), which he has received from one or more users in a given time interval (e.g., in a given day), into m lists $L^k$, where k=1, . . . , m. Here m is arbitrary, but may for example be an integer equal to, or approximately equal to, 1/s, where s is the desired selection probability. Preferably, each list comprises all the checks satisfying exactly one of m mutually exclusive properties, $P_1$, . . . , $P_m$. For instance, if m=1024, each list $L^k$ (k=1, . . . , m) includes all checks received that day that hashed according to a deterministic hash function H to produce a value whose first 10 bits are the 10-bit binary expansion of the integer k−1. Each list $L^k$ (k=1, . . . , m) includes $l_k$ checks $C^k_1$, . . . $C^k_{l_k}$, where $l_k$ represents the number of data strings in list $L^k$. When summed over the m lists, $l_k$ naturally adds up to the total number n of received checks, i.e.

$$l_1 + \ldots + l_k + \ldots l_m = n.$$

The merchant commits to each list $L^k$, by computing a commitment $CM^k$ for $L^k$, and causes the bank to receive $CM^k$ (k=1, . . . , m).

As known in the art, a commitment scheme is a protocol that enables one party to deliver a message to another party, without revealing the contents of the message, and while being committed to this message. The protocol allows the parties to emulate the process of delivering the message in a "locked box," whereby the sending party (in the present case, the merchant) can prevent the receiving party (in the present case, the bank) from knowing anything about the message in the box, until such time in the future when the receiving party is given the key to the box. The receiving party, on his part, can prevent the sending party from changing the message in the box, after the receiving party has already received it. A commitment scheme is typically comprised of two phases: the first phase (the "commitment phase") simulates the delivery of the locked box. When this phase is completed, the receiving party does not know the message yet, but the sending party cannot change it any more. The second phase (the "de-commitment phase") simulates the delivery of the key. The receiving party can now see the message, and verify that the message in the unlocked box is indeed the message to which the sending party committed himself.

In a preferred form, the commitment $CM^k$ for $L^k$ may be a hash value $H(L^k)$, where H is a one-way collision-resistant hash function. Therefore, it is computationally infeasible to derive $L^k$ from $CM^k$, and it is also computationally infeasible to produce two different strings $L_1^k$ and $L_2^k$ such that $H(L_1^k) = H(L_2^k)$.

In the deferred selection protocol featured in the fourth embodiment of the present invention, the payment selection process for determining whether or not a particular check $C_i$ should be selected for payment is deferred until the bank receives the merchant's commitments $CM^k$ (k=1, ..., m) to the lists $L^k$. This is a distinguishing feature of the micropayment scheme described in the fourth embodiment of the present invention. Upon receipt of $CM^k$ (k=1, ..., m), the bank selects one index k between 1 and m in a manner unpredictable to the merchant and to the users. For instance, the bank may digitally sign the day in question (e.g., 2001.01.01), and then use for selection the first 10 bits of this signature. This signature could be hashed before the first ten bits are extracted. The bank's signature can be published (e.g., posted on the Web) so that everyone can verify that k is indeed the index selected by the bank that day. The selected index k is the paying index. The merchant responds by de-committing $CM^k$ into the original list of checks $L^k$. Alternatively, the bank may compute an index k as a function of the merchant's commitments $CM^k$ (k=1, ..., m) to the lists $L^k$. For instance, k could be extracted from the bank's signature of $CM^1$ ... $CM^m$ or $H(CM^1, \ldots CM^m)$ where H is a one-way hash function, or $f(CM^1 \ldots CM^m)$ for some given function f.

The bank then inspects that all is proper. For example, the bank verifies that the checks in the de-committed list are indeed relative to the day in question, that there are no duplicate checks in the list, and that all checks in the list satisfy property $P_k$, that the user signatures, if present, are valid, and so forth. If any of these conditions are not met, the bank may fine or take other punitive measures towards the merchant (or the users, as the case may be—e.g., because the bank discovered that a user has signed two checks with the same serial number). Otherwise, the bank pays the merchant m times the aggregate value of the checks in $L^k$. Alternatively the bank may pay the merchant the aggregate amount of all checks in all lists if the inspected list satisfactorily passes inspection. Some of these payments could also be deferred, as described earlier, if the user's account has insufficient funds to cover these checks.

The users whose checks belong to $L^k$ are then debited in one of several possible ways. For instance, these users can be debited m times the face value of their selected checks (as in the first embodiment) or according to the serial numbers of their selected checks (as in the third embodiment). The bank may exercise scrutiny or mete out punishment in ways envisioned in the prior embodiments. The bank may also ask the merchant to de-commit additional lists to verify that all is proper, or to select more than one paying indices. In the latter case, the bank may pay the merchant m/r times the aggregate value of the checks in $L^k$, where r is the number of lists selected for payment. In this case, the selection probability is r/m, rather than 1/m. Alternatively, the bank may inspect two or more lists and then pay the merchant the aggregate amount relative to all checks in all lists.

Note that commitment can be used recursively within the scope of the invention. For instance, rather than sending to the bank m commitments $CM^k$ (k=1, ..., m) to the lists $L^k$ (k=1, ..., m), the merchant can send the bank a commitment to these m commitments. By way of example, the merchant may send the bank a single value $C=H(CM^1 \ldots CM^m)$ where H is a one-way hash function. After the bank selects one (or more) index k, the merchant may first de-commit C so as to reveal what $CM^k$ was, and then de-commit $CM^k$ as before by revealing the corresponding list of checks. For instance, if $C=H(CM^1 \ldots CM^m)$, then the merchant may reveal the right value for $CM^k$ by revealing all m commitments $CM^1 \ldots CM^m$. The bank may one-way hash these m values to check that the same value $C=H(CM^1 \ldots CM^m)$ is produced, and then retrieve the kth commitment so as to isolate $CM^k$. Of course, the merchant could also commit to the m commitments $CM^1 \ldots CM^m$ by sending the bank not a single commitment C but a plurality of commitments. For instance, the merchant may send a commitment to $CM^1 \ldots CM^{10}$, a second commitment to $CM^{10} \ldots CM^{20}$, and on.

Typically, to commit to m values $V_1 \ldots V_m$ by means of a single value V (e.g., by $V=h(V_1, \ldots, V_m)$ for some one-way hash function h), one must reveal/send all $V_1 \ldots V_n$ to de-commit Vi alone. This may be impractical if m is very large and/or the Vi's are very large. A particularly convenient method for commitment to be used in the inventive system is a generalized Merkle tree. By a "generalized Merkle tree" is meant a commitment to m values that enables one to decommit to just one of such values, without also decommitting to all other values.

A special case of a generalized Merkle tree is the well known Merkle tree commitment scheme described in the U.S. Pat. No. 4,309,569 by Merkle, incorporated herein by reference. One way to implement a Merkle tree is to store the to-be-committed values in the nodes of a possibly undirected graph G, some of whose edges could be directed so as to produce an acyclic (and typically tree-like) subgraph G' (preferably having the same nodes as G), and then using one or more underlying one-way hash functions (e.g., by using a possibly commutative one-way hash based on an underlying one-way hash function) so as to store in each node a value that depends on the values stored at the descendents in G' of that node and possibly additional values as well. In this way, changing at least one or more of the original values causes the value(s) stored in one or more of the root nodes of G' to change as well, with overwhelming probability, unless a collision in one of the underlying one-way hash functions has been found. Using this method, the value(s) stored at the root node(s) constitute a commitment to the original values stored in the graph nodes. There may in addition be some constraints (that can be checked later by the bank) about where in the graph various values that are being committed to may be stored. In any case, the merchant can commit to $CM^1 \ldots CM^m$ using a generalized Merkle tree. Also, a commitment $CM^k$ could be generated by generalized-Merkle-tree hashing the list $L^k$. Use of generalized Merkle trees can occur in any aspect of this invention where commitments are used.

Note that the merchant may find it useful to send to the bank, together with the commitment values $CM^1 \ldots CM^m$ (possibly themselves committed by one or more commitment C), other quantities about the list $L^1 \ldots L^m$, such as the aggregate amounts in each of these lists, or the number of checks in each of these lists. These other quantities can be communicated outside of any commitment. For instance, the merchant may send the bank $CM^1 \ldots CM^m Q^1 \ldots Q^m$, where $Q^i$ represents a quantity of $L^i$ "in the clear." This allows the bank, by way of example, to evaluate the sum of the aggregate amounts of each list without further de-commitments.

There are other, related methods for implementing a probabilistic micropayment scheme that includes a deferred selection protocol. In these methods, the payment selection process is deferred until the bank receives from the merchant a commitment to one or more checks that the merchant has received from a plurality of users. The bank then determines, fairly and probabilistically, which of the committed checks should be payable. The deferred selection protocol of the fourth embodiment of the present invention also allows the bank to punish/eliminate cheating parties, before they can create any substantial damage.

Figure 6:
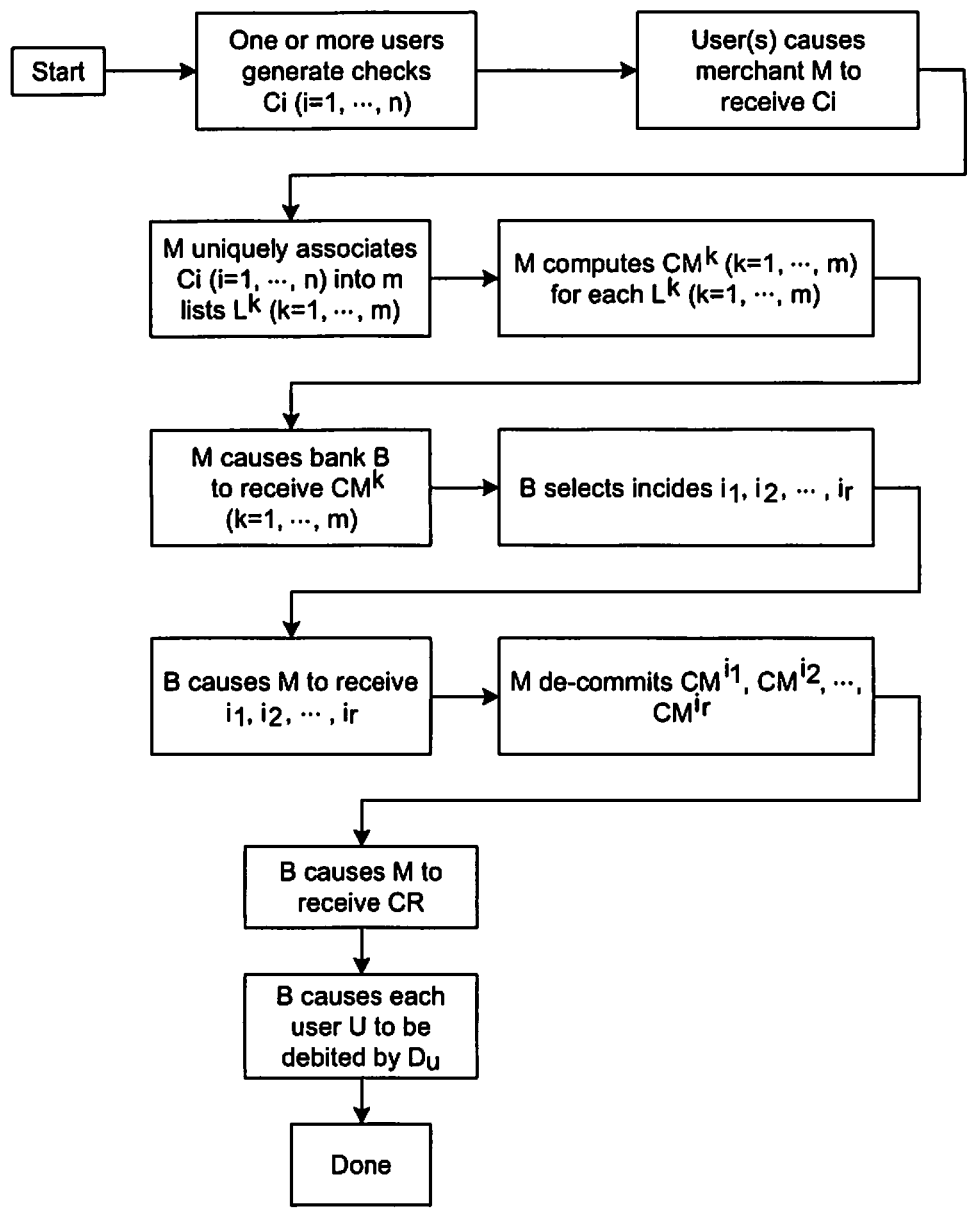
FIG. 6 provides, in flow-chart form, an overview of a method for micropayment transactions in accordance with a fourth embodiment of the present invention.

FIG. 6 provides, in flow-chart form, a schematic overview of a method for micropayment transactions, in accordance with the fourth embodiment of the present invention. A user creates a data string or "electronic check" C, derived from a micropayment transaction T, and sends C to the merchant, when a user wishes to make a payment. In the illustrated embodiment of the invention, a plurality of transactions $T_i$ (i=1, ... n) are involved. The user or users derive a check $C_i$ for each transaction Ti, and causes the merchant to receive the checks $C_i$ (i=1, ..., n).

The merchant groups the checks $C_i$ (i=1, ..., n), which he has received from the users, into m lists $L^k$, where k=1, ..., m. Each list $L^k$ (k=1, ..., m) includes $l_k$ data strings $C^k_1, \ldots C^k_{l_k}$ where $l_k$ represents the number of data strings in a given list $L^k$. When summed over the m lists, $l_k$ naturally adds up to the total number n of received checks, i.e.

$$l_1 + \ldots + l_k + \ldots l_m = n.$$

The merchant then commits to each list $L^k$, by computing a commitment $CM^k$ for $L^k$, and causes the bank to receive $CM^k$ for each k (i.e. for k=1, ..., m).

The grouping of checks into lists may be done according to a specific rule, agreed upon by the merchant and the bank. For example, the check C may be placed in a list $L^i$, where i was computed as a function of C, e.g. by using the serial number of C, or extracting some bits from C, or extracting some bits from the hash of C.

Each transaction $T_i$ is preferably characterized by a transaction value $TV_i$. Also, each data string $C_i$ preferably includes data that represents the transaction value $TV_i$ of the transaction $T_i$ from which $C_i$ is derived. The merchant can thus determine an aggregate value $V^k$ for each list $L^k$, where $V^k$ is given by:

$$V^k = TV^k_1 + \ldots + TV^k_{l_k}.$$

In other words, $V^k$ represents the aggregate value of all the data strings $C^k_1, \ldots, C^k_{l_k}$ in the list $L^k$. In this case, the merchant may also optionally commit to the values $V^k$ in addition to committing to the values $L^k$. That is, the merchant may provide an additional commitment $CV = H(V^1, V^2, \ldots V^m)$ to the list of values $(V^1, V^2, \ldots V^m)$, where H is a one-way hash function. By de-committing CV, the merchant thus reveals the list $(V^1, V^2, \ldots, V^m)$.

In the deferred selection protocol featured in the fourth embodiment, the payment selection process, for determining whether or not a particular check $C_i$ should be selected for payment, is deferred until the bank receives the merchant's commitments $CM^k$ (k=1, ..., m) to the lists $L^k$, and until the bank receives the commitment CV to the values $V^k$, if this option is chosen. This deferral is a distinguishing feature of the micropayment scheme described in the fourth embodiment. Upon receipt of $CM^k$ (k=1, ..., m) (and the optional commitment CV), the bank selects one or more integer indices $i_1, i_2, \ldots, i_r$, and causes the merchant to receive the selected indices $i_1, i_2, \ldots, i_r$. In the fourth embodiment of the present invention, the selection by the bank of the integer indices $i_1, \ldots, i_r$ represents the selection process that determines whether or not a check is selected for payment.

It should be noted that the value of r is arbitrary, and up to the bank. When there are more incidences of attempted fraud, or when there is suspicion upon a particular merchant, a larger value of r may be used. In some cases, the bank may even ask the merchant to de-commit all of his commitments (that is, choose r=m). Choosing r>1 is recommended, in order to have a chance to catch two checks from the same user with the same serial number, rather than throwing out such a user later on statistical evidence.

Upon receipt of the indices $i_1, i_2, \ldots, i_r$, the merchant de-commits those commitments $CM^k$ whose indices correspond to the indices $i_1, i_2, \ldots, i_r$ that he received. In other words, the merchant de-commits $CM^{i_1}, CM^{i_2}, \ldots, CM^{i_r}$, i.e. the merchant causes the bank to receive a de-commit string for each of the $CM^{i_1}, CM^{i_2}, \ldots, CM^{i_r}$. The merchant thereby reveals to the bank $L^{i_1}, L^{i_2}, \ldots L^{i_r}$, if each $CM^k = H(L^k)$. If the commitment CV was previously given to the bank, the merchant reveals to the bank the list $(V^1, \ldots, V^r)$. For those lists whose indices match the particular indices that the bank has selected, the bank is able to see the data strings that are contained in the lists, and therefore the corresponding aggregate transaction values as well. If CV was decommitted as well, then the bank sees the merchant's claimed aggregate transaction value for all lists, and not just the selected lists. The bank can re-compute the aggregate transaction value for the decommitted lists, and compare these values to the decommitment of CV, in order to check for cheating on the part of the merchant. Such checking may also involve checking that each list only contains checks that are appropriate for inclusion in that list, and checking for checks appearing in more than one list.

As a last step in the micropayment method and system featured in the fourth embodiment of the present invention, a fifth party (which may be the bank, or an entity other than the bank) carries out the payment process, i.e. causes a fourth party (which may be the merchant, or an entity other than the merchant) to receive a credit amount, CR. In some cases, such an action may be deferred until certain conditions are fulfilled, such as there being enough funds in the account associated with the creator of the check. The fifth party also causes each user whose checks belong to one or more of the selected lists $L^{i_1}, L^{i_2}, \ldots, L^{i_r}$, to be debited by a debit amount D.

In a preferred form, the credit amount CR received by the merchant (or other fourth party entity) is preferably the aggregate value V of all the checks contained in all of the m lists, namely $$CR = V = V^1 + \ldots V^k + \ldots V^m.$$

To implement this method of determining CR, the optional commitment CV should be used, so that CR can be computed from the values in the decommitment of CR. The amount CR that is paid to the merchant by the bank (or other fifth party) is thus the full aggregated value of all the checks that were received by the merchant and were grouped into the m lists $L^k$ (k=1, ..., m).

In one form of this invention, the debit amount $D_U$ charged to a user U is given by a value related to the aggregate value of all the user's checks contained in the lists whose indices correspond to the indices selected by the bank. For example, the value $D_U$ may be determined by scaling this aggregate value by the quantity m/r, the multiplicative inverse of the selection probability s=r/m:

$$D_U = (V^{i_1}_U + V^{i_2}_U + \ldots + V^{i_r}_U) * (m/r)$$

where $V^k_U$ is the total aggregate value of user U's checks contained in list $L^k$.

In another version of this fourth embodiment of the invention, each check $C_i$ contains information on a serial number $S_i$. Preferably, $S_i$ is a progressive serial number issued by the user creating the check, sequentially ordered starting from 1 (for each user), and is representative of the position of the data string $C_i$ relative to other data strings, in an ordered succession of data strings $C_i$ (from that user). Preferably, $S_i$ is also representative of the order in time of the transaction $T_i$ with respect to other transactions $T_1, \ldots, T_{i-i}$, and $T_{i+1}, \ldots, T_n$ that that user has participated in with this merchant.

In this form of the invention, the debit amount $D_U$ is determined using the serial number $S_i$ in each check contained in those lists selected for payment by the bank. In a case in which each transaction $T_i$ has an equal value TV, the debit amount corresponding to a single check $C_i$ is given by:

$$(SN_i - S_{max,U})*TV,$$

where $S_{max,U}$ denotes the serial number appearing on the most recent check from the user U who produced $C_i$ that has so far been processed and selected for payment. A more detailed description is presented in the previous section III, regarding the use of serial numbers on the checks to eliminate the risk to the user of being charged in excess of what he actually spent. In other words, once the r lists of checks are selected for payment in this fourth embodiment, the checks may be processed individually similar to the way checks were processed in the third embodiment of this invention, assuming that the relevant selection probability is understood to be r/m.

Figure 7:
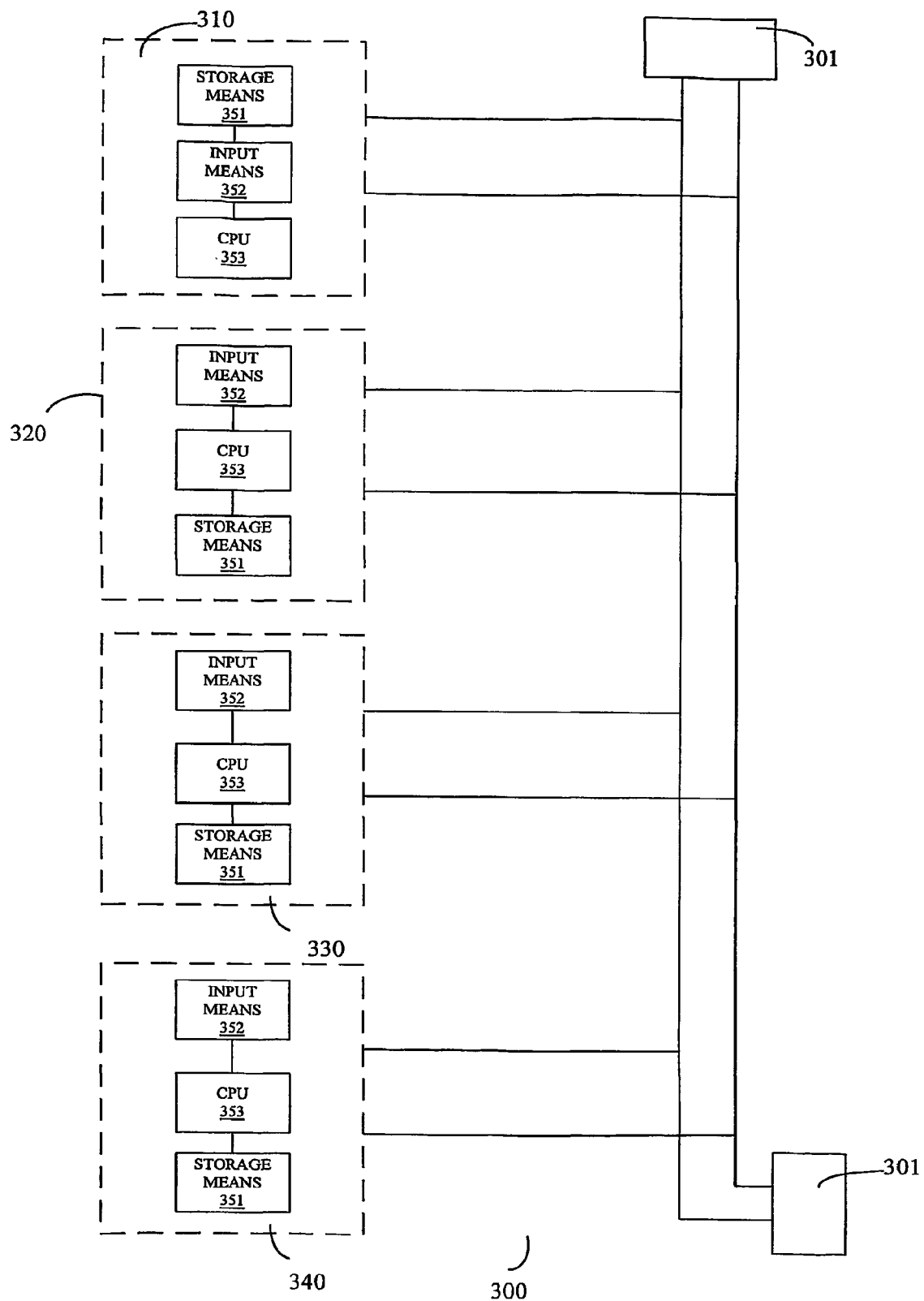
FIG. 7 provides a schematic block diagram illustrating the components of a micropayment system for establishing payment for a transaction, in accordance with the fourth embodiment of the present invention.

FIG. 7 illustrates a system 300 for establishing payment for a plurality of n transactions $T_1, T_2, \ldots, T_i, \ldots, T_n$, each $T_i$ having a value $TV_i$. The system 300 includes communications means for transmitting data between a user, a merchant, a bank, and a fourth party. The system 300 also includes a first processing means 310, a second processing means 320, a third processing means 330, and a fourth processing means 340. All four processing means typically include storage means 351 for storing data, input means 352 for inputting data, and a CPU 353 that implements the system commands.

The first processing means 310 is operative by a user for deriving, inputting, and storing a data string $C_i$ (1 i n) for each $T_i$. The second processing means 320 is operative by merchant, and responsive to receipt of $C_i$ (i=1, ... n), for uniquely associating groups of said data strings $C_i$ (i=1, ..., n) into m lists $L^k$ (k=1, ..., m), and for inputting and storing said lists $L^k$ (k=1, ..., m). Each list $L^k$ includes data strings $C^k_1, \ldots, C^k_{l_k}$, and $\Sigma^m_{k=1} l_k = n$. The second processing means is further operative by the merchant for computing a commitment $CM^k$ for each $L^k$, and for inputting and storing the commitments $CM^k$ (k=1, ..., m).

The third processing means 330 is operative by the bank, upon receipt of the commitments $CM^k$, for selecting one or more integer indices $i_1, i_2, \ldots, i_r$, and for causing the second party to receive the indices $i_1, i_2, \ldots, i_r$, where $1 \le i_r \le m$ for all r. The fourth processing means 340 is operative by the merchant, upon receipt of the indices $i_1, i_2, \ldots, i_r$, for de-committing CM, thereby revealing $L^{i1}, \ldots, L^{ir}$ to the bank.

The system 300 includes means 370, operative by the third party upon revelation of $L^{i1}, \ldots, L^{ir}$, for causing the user to be debited by a debit amount D and for causing a fourth party to receive a credit amount CR.

In each of the proposed embodiments of this invention, tamper-resistant hardware such as smart cards or processors in cell phones may be used to provide security.

In sum, methods and systems are featured in the present invention, which 1) eliminate the need for user-merchant interaction in the payment selection process; 2) incorporate time constraints into the system; 3) provide a selective deposit protocol which eliminates the risk of excessive charge to the user; and 4) provide a deferred selection protocol which provide the bank with flexibility and control over the payment process.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A method for a second party to receive payment from a first party for a transaction, the method comprising:

receiving by a second hardware device of the second party a first data string from a first hardware device of the first party, wherein the first data string is derived from a record of the transaction using a secret key of the first party and wherein the first data string is being used as an electronic instrument to request payment for the transaction;

generating by the second party using a second data string derived from the first data string via a secret key of the second party, wherein the second data string is substantially unpredictable by the first party;

determining by the second hardware device of the second party without help from the first party that the second data string has a predetermined property, wherein the second data string having the predetermined property is used to enable payment to the second party for the transaction; and in response to determining by the second hardware device of the second party that the second data string has the predetermined property, transmitting information to a third hardware device of a third party enabling the third party to verify that the second data string has the predetermined property;

in response to determining by the third hardware device of the third party that the second data string has the predetermined property, receiving by the second party a payment amount associated with the second data string;

wherein the first, second and third hardware devices comprise a processor, wherein determining by the second party without help from the first party that the second data string has a predetermined property comprises determining that a function of the second data string, F, is less than a selection rate, s, wherein s is a probability that the second data string would be selected for payment and wherein s is determined by the second party using information received from the third party and $0 < s < 1$, and F is a public function that takes the second data string as input, and returns as output a number greater than 0 and less than 1.

2. The method of claim 1, further comprising determining the predetermined property before the transaction.

3. The method of claim 1, further comprising determining the predetermined property from at least one of the transaction or the first data string.

4. A method of claim 2, further comprising authenticating at least a portion of the first data string.

5. A method of claim 4, wherein authenticating at least a portion of the first data string comprises authenticating the at least a portion of the first data string using a fifth party on behalf of the first party.

6. A method of claim 1, wherein receiving by the second hardware device of the second party a first data string from the first party, wherein the first data string is derived from the transaction comprises receiving by the second hardware device of the second party a first data string derived from generating a digital signature for at least a portion of the transaction, using a secret key of the first party.

* * * * *